United States Patent
Birchmeier

(10) Patent No.: US 11,642,822 B2
(45) Date of Patent: May 9, 2023

(54) LARGEST EMPTY CORNER RECTANGLE BASED PROCESS DEVELOPMENT

(71) Applicant: IMFLUX INC., Hamilton, OH (US)

(72) Inventor: Brandon Michael Birchmeier, Morrow, OH (US)

(73) Assignee: IMFLUX INC., Hamilton, OH (US)

( * ) Notice: Subject to any disclaimer, the term of this patent is extended or adjusted under 35 U.S.C. 154(b) by 0 days.

(21) Appl. No.: 17/290,584

(22) PCT Filed: Dec. 15, 2020

(86) PCT No.: PCT/US2020/065155
§ 371 (c)(1),
(2) Date: Apr. 30, 2021

(87) PCT Pub. No.: WO2021/257112
PCT Pub. Date: Dec. 23, 2021

(65) Prior Publication Data
US 2022/0184869 A1    Jun. 16, 2022

Related U.S. Application Data

(60) Provisional application No. 63/039,243, filed on Jun. 15, 2020.

(51) Int. Cl.
*B29C 45/77* (2006.01)
*B29C 45/76* (2006.01)

(52) U.S. Cl.
CPC .......... *B29C 45/77* (2013.01); *B29C 45/762* (2013.01); *B29C 2945/76103* (2013.01);
(Continued)

(58) Field of Classification Search
CPC ........ B29C 45/762; B29C 2945/76103; B29C 2945/76381; B29C 2945/76384;
(Continued)

(56) References Cited

U.S. PATENT DOCUMENTS

2003/0149501 A1* 8/2003 Tuszynski ........ G05B 19/41865
  700/95
2005/0046056 A1* 3/2005 Dong .................... G11B 7/263
(Continued)

FOREIGN PATENT DOCUMENTS

JP    2001-205683 A    7/2001

OTHER PUBLICATIONS

International Application No. PCT/US20/65155, International Search Report and Written Opinion, dated Mar. 22, 2021.
(Continued)

*Primary Examiner* — Matthew J Daniels
*Assistant Examiner* — Gregory C. Grosso
(74) *Attorney, Agent, or Firm* — Marshall, Gerstein & Borun LLP

(57) ABSTRACT

Systems and approaches for determining design of experiment parameters using largest empty area rectangle optimization for an injection molding system. The systems and methods include obtaining pressure versus time data sets indicative of fill step pressures and corresponding fill step times for a plurality of mold cycles and defining a low and high pressure versus time curves from the data sets, with the low and high pressure versus time curves being two surfaces of a geometric shape. The systems and methods further include identifying a top surface and a bottom surface of the geometric shape; identifying a rectangle having the largest area of all rectangles contained within the first geometric shape; and generating design of experiment parameters from the largest area rectangle.

18 Claims, 12 Drawing Sheets

(52) U.S. Cl.
CPC ............... *B29C 2945/76381* (2013.01); *B29C 2945/76384* (2013.01); *B29C 2945/76418* (2013.01); *B29C 2945/76464* (2013.01); *B29C 2945/76481* (2013.01); *B29C 2945/76498* (2013.01); *B29C 2945/76976* (2013.01)

(58) Field of Classification Search
CPC ........... B29C 2945/76418; B29C 2945/76464; B29C 2945/76481; B29C 2945/76498; B29C 2945/76976; B29C 45/76
See application file for complete search history.

(56) References Cited

U.S. PATENT DOCUMENTS

| | | | |
|---|---|---|---|
| 2006/0197247 A1* | 9/2006 | Speight | B29C 45/766 |
| | | | 425/145 |
| 2008/0065261 A1 | 3/2008 | Grimm et al. | |
| 2015/0224696 A1* | 8/2015 | Altonen | B29C 45/7646 |
| | | | 264/40.3 |

OTHER PUBLICATIONS

Kumar et al., Computer simulation of transport processes during injection mold-filling and optimization of the molding conditions, Journal of Materials Processing Technology [online], vol. 120, Issues 1-3, pp. 436-449 (Jan. 15, 2002). Retrieved from the Internet: <https://doi.org/10.1016/S0924-0136(01)01211-0> Abstact Only.

Nagahanumaiah et al., Computer aided rapid tooling process selection and manufacturability evaluation for injection mold development, Computers in Industry, vol. 59, Issues 2-3, pp. 262-276 (Mar. 2008). Retrieved from the Internet: <https://doi.org/10.1016/j.compoind.2007.06.21>. Abstract Only.

* cited by examiner

LARGEST EMPTY CORNER RECTANGLE BASED PROCESS DEVELOPMENT

FIELD OF THE DISCLOSURE

The present disclosure relates to methods and systems for optimization of injection mold cycles, and specifically to determining a range of operational parameters for performing design of experiments for injection molding.

BACKGROUND

Injection molding is a technology commonly used for high-volume manufacturing of parts constructed of thermoplastic materials. During repetitive injection molding processes, a thermoplastic resin, typically in the form of small pellets or beads, is introduced into an injection molding machine which melts the pellets under heat and pressure. In an injection cycle, the molten material is forcefully injected into a mold cavity having a particular desired cavity shape. The injected plastic is held under pressure in the mold cavity and is subsequently cooled and removed as a solidified part having a shape closely resembling the cavity shape of the mold. A single mold may have any number of individual cavities which can be connected to a flow channel by a gate that directs the flow of the molten resin into the cavity. A typical injection molding process generally includes four basic operations: (1) heating the plastic in the injection molding machine to allow the plastic to flow under pressure; (2) injecting the melted plastic into a mold cavity or cavities defined between two mold halves that have been closed; (3) allowing the plastic to cool and harden in the cavity or cavities while under pressure; and (4) opening the mold halves and ejecting the part from the mold.

In these systems, a control system controls the injection molding process according to an injection pattern that defines a series of setpoint values for control parameters of the various components of the injection molding machine. For example, the injection cycle can be driven by a fixed and/or a variable melt pressure profile whereby the controller uses sensed pressures at a nozzle as the input for determining a driving force applied to the material.

Each injection molding cycle typically has an initial phase wherein an injection molding system rapidly increases the pressure of an injection mold to a setpoint pressure value, a fill phase where the pressure of the injection mold is held at a steady-state as molten material is injected into the injection mold cavity, a hold phase where the pressure is held at the steady-state pressure value without injecting further molten material into the injection mold cavity, and finally an ejection where the injection mold cavity is open and the part is ejected from the injection molding system. Each of these phases may have varied pressures and temporal lengths to ensure the proper formation of a defect free injection molded part. For example, short shot defects may occur if too little pressure is applied during one or more of the described phases, or if the phases are not performed for an adequate amount of time. Additionally, flashing defects may occur if pressures are too high or if the phases are performed for too long of a time. Any change in injection molding material, mold geometries, environmental factors, or changes in other elements and factors may require different pressures and times for the different phases of injection mold cycles to fabricate defect free injection molded parts.

Performing design of experiments (DOE) for injection molding allows for a user to determine ranges of operational parameters for performing injection molding cycles. For example, DOE may be utilized to determine the setpoint values and/or durations that control the above-described mold cycle. To this end, DOE analysis can provide operational parameter ranges that provide robust injection mold cycle performance allowing for the fabrication of parts with reduced numbers of defects amid potentially varying environmental conditions and operational parameters (e.g., a fill pressure, a fill time, cooling time, etc.), which may also be referred to herein as mold cycle parameters. DOE can also be useful for analyzing relationships between mold cycle parameters and the size, or density of injection molded parts.

However, performing DOE analyses can be extremely time consuming and expensive as the number of DOE experiments increases exponentially with the number of parameters being tested. For example, four experiments should be performed when considering two parameters, and eight experiments must be performed when considering three parameters. It is therefore beneficial only to consider parameters that may be the most impactful of an injection mold cycle performance. Similarly, it may be useful to reduce the number of values tested for each parameter. For example, when testing for four parameters and for 3 test values at each parameter (e.g., fill pressures, fill times, etc.), a DOE requires 3×3×3×3, resulting in 81 experiments. For injection molding, it is common to work with multiple cavities and collect statistical data for several part dimensions which can increase the number of experiments required. Executing a large number of experiments for DOE is often expensive and very time consuming.

SUMMARY

A method and system for optimization of design of experiments (DOE) for an injection molding system of the present disclosure includes obtaining pressure versus time data sets and defining, in pressure versus time coordinate space, a largest area geometric shape including defect-free injection mold cycle operational parameters. The optimization process described utilizes a Largest Empty Corner Rectangle (LECR) technique that determines a range of operational parameter values that may be provided to an injection molding system to perform a DOE to fabricate injection molded parts of a desired weight and/or density, and with minimal or no defects.

In injection molding systems, a control system controls the injection molding process according to an injection pattern that defines a series of setpoint values for control parameters of the various components of the injection molding machine. For example, the injection cycle can be driven by a fixed and/or a variable melt pressure profile whereby the controller uses sensed pressures at a nozzle as the input for determining a driving force applied to the material. Injection molding cycles typically have an initial phase wherein an injection molding system rapidly increases the pressure of an injection mold to a setpoint pressure value, a fill phase where the pressure of the injection mold is held at a steady-state as molten material is injected into the injection mold cavity, a hold phase where the pressure is held at the steady-state pressure value without injecting further molten material into the injection mold cavity, and an ejection where the injection mold cavity is opened and the part is ejected from the injection molding system. Each of the phases may have variable pressures and temporal lengths to ensure the proper formation of a defect-free injection molded part. For example, short shot defects and flashing defects may occur due to injection molding cycle pressures and phase times. Further, changes in injection molding material, mold geometries, environmental factors, or changes in other elements and factors may require different pressures and times for the different phases of injection mold cycles to fabricate defect-free injection molded parts.

Typically, during DOE, it is important for a user to induce as much variation, by altering different variables (e.g., fill time, fill pressure, holding time, etc.), as possible into a part without making obvious aesthetic defects. DOE analysis is time consuming and expensive due to the requirement to test multiple parameters which increases the number of DOE experiments exponentially. Further, limits such as maximum and minimum fill pressures and fill times, and the interactions between variables can be difficult to predict. As a result, multiple DOE runs are often required to determine a range of values for each independent variable that is tested. LECR predefines limits of variables so that a single DOE is required in the process development, saving significant time in both the running of the DOE and the time spent performing the inspection of the parts made. Requiring one DOE during process development, eliminates the need for subsequent runs and inspections, potentially saving days or weeks of development time.

The systems and methods disclosed provide an efficient optimization technique for determining a range of operational values for performing DOE. The optimization reduces the number of DOE experiments required by determining a defect-free, or minimal defect, operating range for fill pressure, and fill time. The determined ranges of operating values reduces the number of values that need to be tested by DOE experiments, and therefore, reduces the time and money spent performing DOE for an injection molding system.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals which:

DETAILED DESCRIPTION

An optimization process for determining optimal operating parameters for a design of experiments (DOE) of an injection molding cycle is herein described. The optimization process described utilizes a Largest Empty Corner Rectangle (LECR) technique that determines a range of operational parameter values that may be provided to an injection molding system to perform a DOE to fabricate injection molded parts of a desired weight and/or density, and with minimal or no defects. For effective use of a DOE it is often important for the user to induce as much variation, by altering different variables (e.g., fill time, fill pressure, holding time, etc.), as possible into the part without making obvious aesthetic defects. It can be difficult to predict limits of the variations and their interaction with other variables being tested. As a result, multiple DOE runs may be required before the range of each independent variable is realized. LECR predefines these limits so that only one DOE is ever needed in the process development, saving significant time in both the running of the DOE and the time spent performing the inspection of the parts made. If a user can ensure only one DOE will be needed during process development, subsequent runs and inspections are eliminated, potentially saving days or weeks of development time.

A DOE in the injection molding context is a planned study or set of experiments for determining how different operating parameters (e.g., fill pressure, fill time, holding time, cooling time, etc.) effect the size, density, and defects of fabricated parts. The number of experiments required for a DOE increases exponentially with the number of parameters, and number of values tested for each parameter. For example, for two parameters, a minimum of four experiments are required, while for four parameters a minimum of 16 experiments are required. Further, if there are three values to be tested at each of the four parameters, 81 experiments are required to perform a robust DOE. Therefore, a DOE can be very time consuming and costly due to the numbers of experiments required. The systems and methods disclosed provide an efficient optimization technique for determining a range of operational values for performing DOE. The optimization reduces the number of DOE experiments required by determining a defect-free, or minimal defect, operating range for fill pressure, and fill time. The determined ranges of operating values reduces the number of values that need to be tested by DOE experiments, and therefore, reduces the time and money spent performing DOE for an injection molding system.

Figure 1:
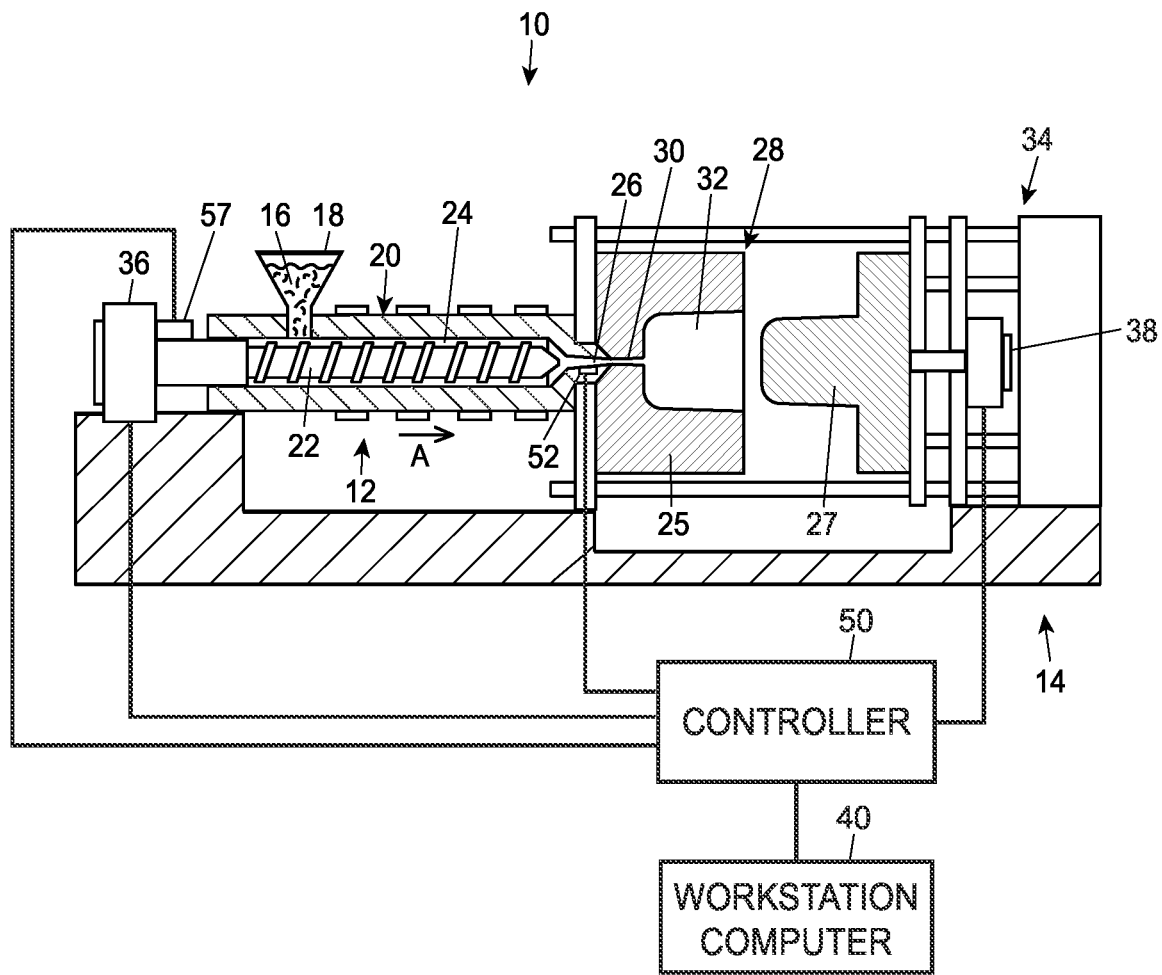
FIG. 1 illustrates an injection molding apparatus that generally includes an injection system and a clamping system for performing injection mold cycles.

Referring to the figures in detail, FIG. 1 illustrates an exemplary injection molding apparatus 10 that generally includes an injection system 12 and a clamping system 14. The injection molding apparatus 10 is one example of an injection molding system that may implement the LECR technique or may be provided with resultant parameters from the LECR technique described herein. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24, toward a nozzle 26 to form a shot of thermoplastic material, which will be injected into a mold cavity 32 of a mold 28 via one or more gates 30 that direct the flow of the molten thermoplastic material 24 into the mold cavity 32. In other embodiments, the nozzle 26 may be separated from one or more gates 30 by a feed system (not shown). The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. The latter may be considered a family of mold cavities.

A controller 50 is communicatively connected with a nozzle sensor 52, located in the vicinity of the nozzle 26, a linear transducer 57 located proximate the reciprocating screw 22, a screw control 36, and a clamp control 38 via one or more communication links. The one or more communication links may include a wired connection, a wireless connection, a mechanical connection, a hydraulic connection, a pneumatic connection, or any other type of wired or wireless communication connection known to those having ordinary skill in the art that will allow the controller 50 to with the sensors 52 or 57 and/or to send a control signal to the screw control 36, clamp control 38, or any other component of the injection molding apparatus 10. A workstation computer 40 is communicatively connected to the controller to provide the controller with operational parameters for performing LECR optimization methods described herein. The workstation computer 40 may include a memory that stores processor executable instructions that, when executed by a microprocessor of the workstation computer 40, implement the disclosed techniques. In embodiments, the workstation computer 40 may be communicatively coupled to the controller 50 via a wired connection or a wireless connection.

The linear transducer 57 may measure an amount of linear movement of the reciprocating screw 22 mechanically, optically, pneumatically, magnetically, electrically, ultrasonically, or the linear transducer 57 may use any other method of measuring linear movement. Similarly, the nozzle sensor 52 may sense the presence of thermoplastic material optically, pneumatically, electrically, ultrasonically, mechanically or otherwise by sensing changes due to the arrival of the thermoplastic material. When pressure of the thermoplastic material is measured by the nozzle sensor 52, the nozzle sensor 52 may send a signal indicative of the pressure to the controller 50 via one of the communication links. The signal may be analyzed by the controller 50 and/or the workstation computer 40 for performing the LECR based parameter optimization for performing a DOE.

In the embodiment of FIG. 1, the nozzle sensor 52 may be a pressure sensor that measures (directly or indirectly) melt pressure of the molten thermoplastic material 24 in vicinity of the nozzle 26. The nozzle sensor 52 generates an electrical signal that is transmitted to the controller 50. The controller 50 then commands the screw control 36 to advance the screw 22 at a rate that maintains a desired melt pressure of the molten thermoplastic material 24 in the nozzle 26. The screw control 36 may utilize a cavity pressure as an input to determine how for to advance the screw 22. This is known as a pressure controlled process. While the nozzle sensor 52 may directly measure the melt pressure, the nozzle sensor 52 may also indirectly measure the melt pressure by measuring other characteristics of the molten thermoplastic material 24, such as temperature, viscosity, flow rate, etc., which are indicative of melt pressure. Likewise, the nozzle sensor 52 need not be located directly in the nozzle 26, but rather the nozzle sensor 52 may be located at any location within the injection system 12 that is fluidly connected with the nozzle 26. If the nozzle sensor 52 is not located within the nozzle 26, appropriate correction factors may be applied to the measured characteristic to calculate an estimate of the melt pressure in the nozzle 26. The pressure sensor 52 need not be in direct contact with the injected fluid and may alternatively be in dynamic communication with the fluid and able to sense the pressure of the fluid and/or other fluid characteristics. In some embodiments, the nozzle sensor 22 may additionally or alternative include a velocity sensor that senses the velocity of the molten thermoplastic material 24 as it exits the nozzle 26.

During am injection molding cycle, sensors (such as the nozzle sensor 52, the linear transducer 57, and/or other sensors) may be employed for measuring various parameters, such as cavity pressure, cavity temperature, etc. The sensors may generate electrical signals indicative of the parameters. In some embodiments, the sensors provide the electrical signals directly to the workstation computer 40. In other embodiments, the sensors provide the electrical signals to the controller 50, which then communicates the electrical signals to the workstation computer 40 for further analysis. The workstation computer 40 may determine a range of parameter values for performing LECR optimization for a DOE from the signals. Additionally, the workstation computer 40 may configure the controller 50 with new settings and parameter values for performing a next mold cycle, based on the received signals from the sensors. The workstation computer 40, in communication with the controller 50, may perform the LECR based optimization as described herein to reduce the number of experiments performed in a DOE for an injection mold system. This reduces the time and cost required for performing a DOE.

Figure 2:
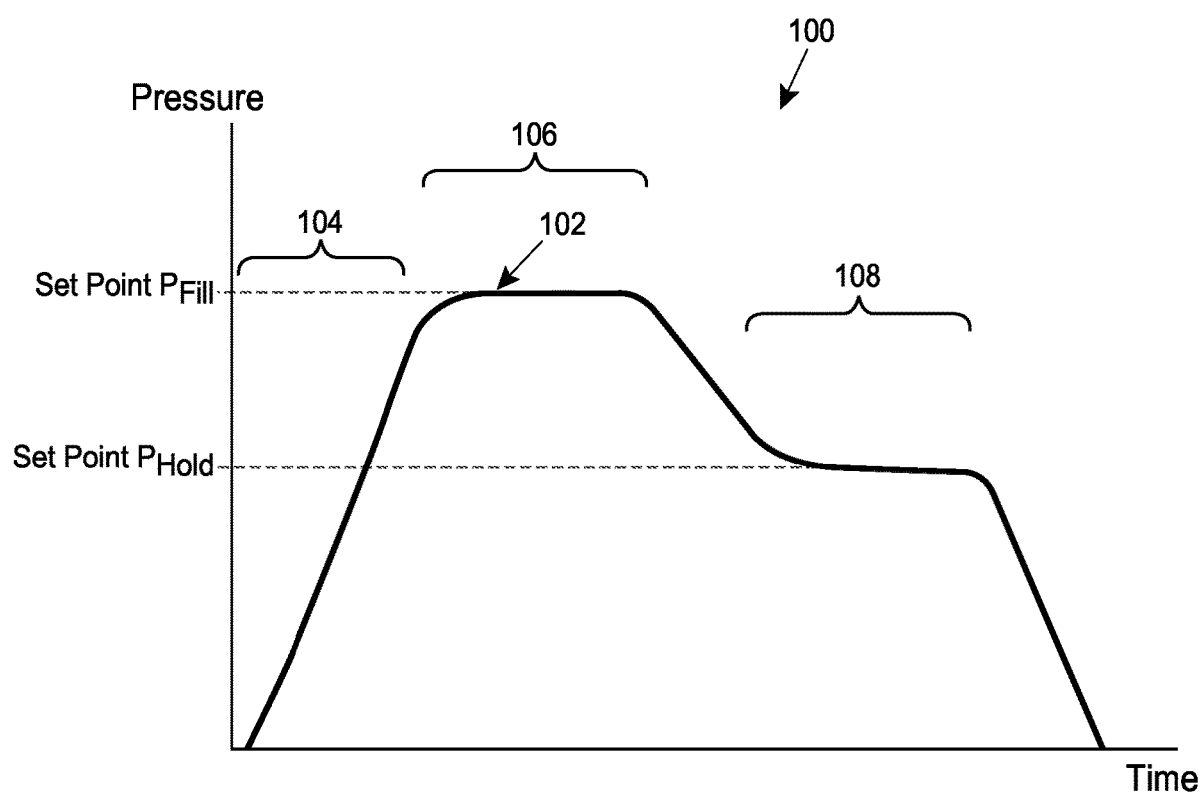
FIG. 2 is a plot of melt pressure values against time for a mold cycle executed by an injection molding machine.

FIG. 2 is a plot 100 of melt pressure values 102 against time for a mold cycle executed by the injection molding machine 10. To this end, the melt pressure values 102 may be generated by the nozzle sensor 52 and communicated to the controller 50 during the execution of the mold cycle. During an initial phase 104 of the mold cycle, pressure rapidly increases to a set point value (set point PFill). In the fill phase 106, the pressure is held at the steady-state pressure value as the mold cavity 32 is filled. When molten plastic material 24 nears the end of the mold cavity 32, pressure is reduced to second, lower, set point value (set point PHold). In the pack and hold phase 108, the pressure is held at the steady-state pressure value as the material 24 in the mold cavity 32 cools. After the material 24 is cooled, the mold 28 is opened in the molded part is ejected from the mold cavity 32.

The times and pressures for each of the initial phase 104, fill phase 106, hold phase 108, set point PFill, and set point PHold influence whether a part is fabricated with defects (e.g., flashing and short-shot defects) which is material and mold dependent.

Figure 3:
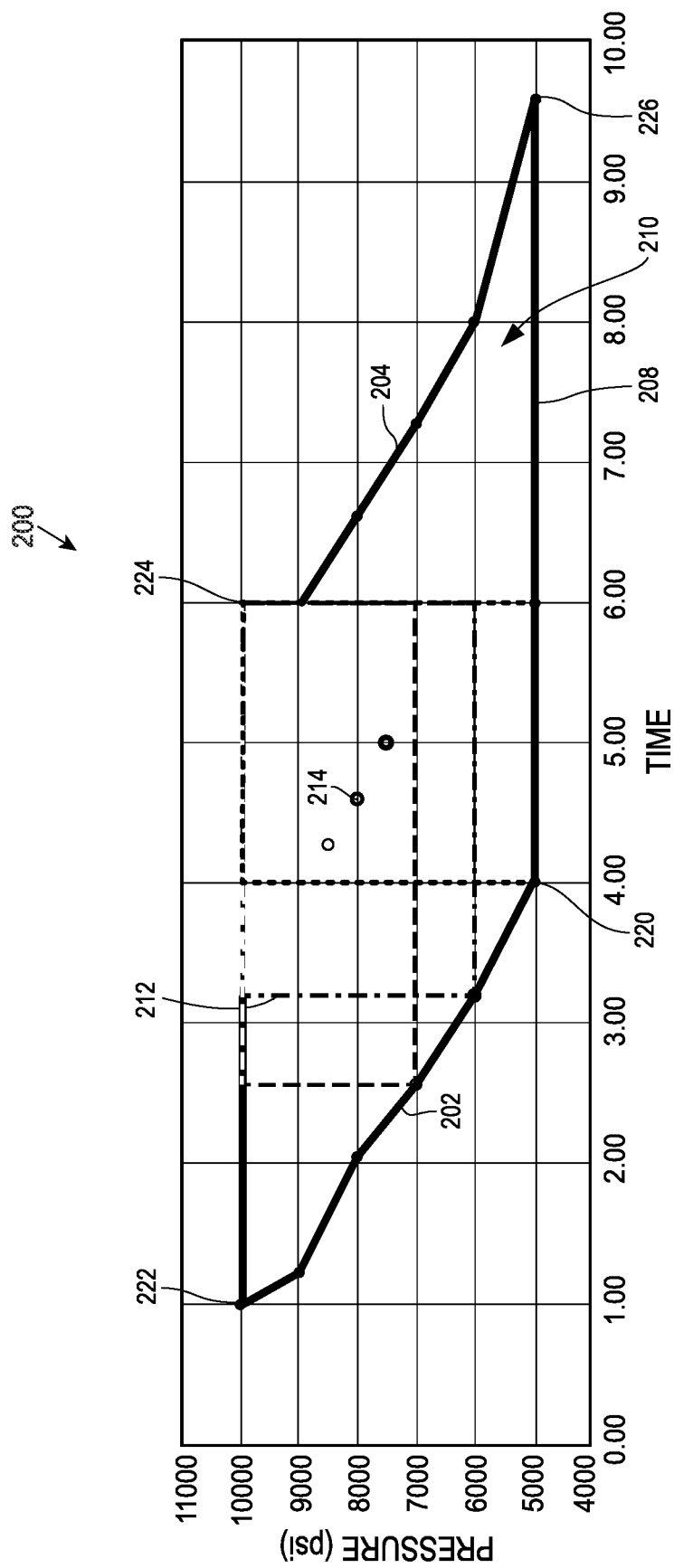
FIG. 3 is a plot of fill pressure vs. time for use in a largest empty corner rectangle (LECR) optimization method.

FIG. 3 is a plot 200 of PFill pressure vs. time for use in a largest empty corner rectangle (LECR) optimization method described herein. The LECR optimization method is used to determine a starting PFill pressure and PFill duration for a DOE to reduce the number of cycles required for the DOE. The LECR optimization method described herein can reduce the amount of time for a DOE for an injection molding system which allows for faster commission of an injection molding machine, and prevents material waste and extra costs associated with DOE.

The plot 200 in FIG. 3 has a vertical PFill pressure axis, and a horizontal PFill Time Duration axis. The data plotted in FIG. 3 has a short-shot limit line 202, a flashing limit line 204, a maximum pressure limit 206, and a minimum pressure limit 208 that together define and form the bounds of a defect-free fabrication space 210. While referred to as the defect-free fabrication space 210, a part may be fabricated with parameter values within the defect-free fabrication space 210 that contains a defect. The operating parameter values inside of the defect-free fabrication space 210 are parameter values that have been determined to generate a part with no visible defects, which is not to say that every part fabricated with parameter values within the defect-free fabrication space 210 is necessarily defect free. As it is used herein, the term "defect-free" may refer to threshold expected proportion of molded parts that do not exhibit defects (e.g., 95%, 99%, 99.9%, etc.) The distance between the various boundaries of the defect-free fabrication space 210 depend on the specific injection molding system and properties such as the geometry of the physical injection mold, temperature requirements, pressure requirements, the injection molding materials, and other factors and elements of the injection molding system. Additionally, the flashing limit line 204 is also the line that signifies when gate seal has been achieved or when the cavity is completely filled and no more materials can be physically injected into the mold. Performing an injection mold cycle having a PFill pressure and PFill duration time inside of the defect-free fabrication space 210 results in the fabrication of a defect-free injection molded part. Performing an injection mold cycle having a PFill pressure and PFill duration below the short-shot limit line 202 will result in an injection molded part having a short-shot defect or another defect resulting from insufficient pressure, and performing an injection molding cycle with a PFill pressure and PFill duration above the flashing limit line 204 will result in an injection molded part having flashing defects or another defect resulting from overpressurization.

In embodiments, the short-shot limit line 202 may be considered to be a low-pressure versus time curve, as described further herein, and the flashing limit line 204 may be referred to as a high-pressure versus time curve. The short-shot limit line 202 line has a minimum pressure value at the Low-Low coordinate 220, and a maximum pressure value at the High-Low coordinate 222 in the pressure versus time coordinate space. The flashing limit line 204 has a minimum pressure value at the Low-High coordinate 226 and a maximum pressure value at the High-High coordinate 224. The minimum pressure limit 208 may be defined by a line connecting the minimum pressure value data points of the short-shot limit line 202 and the flashing-limit line 204, i.e., by connected the Low-Low coordinate 220 and the Low-High coordinate 226. The maximum pressure limit line 206 may be defined by a line connecting the maximum pressure values of the short-shot limit line 202 and the flashing-limit line 204, i.e., by connecting the Low-High coordinate 222 and the High-High coordinate 224. The defect-free fabrication space 210 may be a polygon or other geometric shape defined by the flashing limit line 204, short-shot limit line 202, the maximum pressure limit 206, and the minimum pressure limit 208. In embodiments, the defect-free fabrication space 210 may be a convex polygon, a concave polygon, an orthogonal polygon, a rectilinear polygon, or a shape with curves such as a circle, an oval, a semicircle, a semioval, a geometric shape that includes both curved and straight lines, or another geometric shape. In embodiments, each of the low-pressure versus time curve and the high-pressure versus time curve may be considered to be surfaces of the shape that defines the defect free fabrication space 210. Additionally, in embodiments, the defect-free fabrication space 210 may include more than two dimensions and the boundaries that define the defect-free fabrication space 210 may be two dimensions, three dimensions, or more dimensions depending on the dimensions of the defect-free fabrication space. For example, the defining surfaces or boundaries of the defect-free fabrication space 210, such as the short-shot limit 202 and flashing-limit 204 of FIG. 3, may have dimensions equal to the dimensions of the defect-free fabrication space 210. Alternatively one or more of the defining boundaries of the defect-free fabrication space 210 may have a number of dimensions less than that of the defect-free fabrication space. In embodiments, the boundary of the defect-free fabrication space may be a curve or surface that encompasses the defect-free fabrication space 210, such as a circle for 2D defect free-fabrication space, and a surrounding sphere for a 3D defect-free fabrication space 210.

As illustrated in FIG. 3, multiple rectangles can be inscribed inside of the defect-free fabrication space 210, with each rectangle including a set of PFill pressures and PFill times. Each of the multiple rectangles may have vertices or contacts on the boundaries of the defect-free fabrication space 210. The vertices or contacts may include one or more of a fixed contact, an independent sliding contact, a dependent sliding contact, a reflex contact, or a fixed edge contact. Some rectangles may have vertices within the defect-free fabrication space 210 that do not abut any of the boundaries of the defect-free fabrication space 210. Each of the rectangles is restricted to a subset of points defined by the boundaries of the defect-free fabrication space 210.

The largest empty corner rectangle 212 (LECR) is the largest area rectangle able to be inscribed within the defect-free fabrication space 210. The LECR provides the largest set of PFill pressures and PFill duration times that enable the fabrication of a defect-free injection molded piece. The center point 214 of the LECR 212 provides a starting point for a DOE for the injection molding system. To this end, in some scenarios, the center point 214 of the LECR 212 provides the PFill pressure and PFill duration time that is robust to changes in temperature, pressure, environmental changes, and other variants or inconsistencies in the injection molding system or between cycles of the injection molding system. While illustrated as restricted rectangles in FIG. 3, other geometric shapes such as triangles, circles, other polygons or asymmetric shapes that are restricted by the geometric shape defining the defect-free fabrication space 210 may be used to determine DOE parameters. Additionally, the geometric shapes may be axis-oriented or arbitrarily oriented within the boundaries of the larger geometric shape defining the defect-free fabrication space 210. Accordingly, the use of the word "rectangle" herein, including in the acronym largest empty corner rectangle (LECR), does not limit the disclosed techniques to rectangles and envisions alternate implementations that define these other types of geometric shapes within the defect-free fabrication space 210.

In embodiments, the input values for parameters for the DOE process may be determined from the determined center point 214 of the LECR 212, from a range of values around the center point 214, from a non-center point within the LECR 212, from a point within a non-LECR rectangle in the error-free fabrication space 210, from a range of values within the LECR 212, as a series of fill step times and fill step pressures in the pressure versus time space, or from another point in the error-free fabrication space 210. In embodiments, DOE input parameter values may be determined from a range of values around the center point 214, or from a range of values around another point in the error-free fabrication space 210. Additionally, the DOE input parameters may include a step time, a step pressure, a cooling time, and/or a pressure process factor. Threshold values may be used to determine the range of possible input values for the DOE parameters. For example, it may be determined that input values for the DOE parameters include a step time of 2 seconds and that a threshold of 0.5 seconds is acceptable, and therefore the value for the DOE parameter may be determined to be anywhere from 1.5 to 2.5 seconds. The threshold value may be determined by a user and input to a system, determined during a LECR optimization process, or determined through defect analysis of parts over multiple injection molding cycles.

In embodiments, a user may choose a different rectangle other than the LECR. For example, a user may require that the injection molding cycle be performed within a given amount of time, therefore a maximum acceptable time may define a sub region of the defect-free fabrication space 210 for determining a LECR of the sub region. Additionally, it may be required that an injection system have a maximum PFill pressure that limits the size of the rectangle in the defect-free fabrication space 210. It should be appreciated that these limits may result in larger tolerances of molded part dimensions. Nonetheless, this enables operator to tune the DOE optimization process to emphasizing other operational aspects of the injection molding process. In embodiments, a user may be provided, via a user interface (e.g., a screen on a mobile device, a screen on a computing device, a monitor, through data sets, etc.) with multiple rectangles in the defect-free fabrication space 210 and the user may select a given rectangle to operate within for the DOE of an injection molding system, and/or for the fabrication of parts using an injection molding system.

It should be noted that the LECR is not always the absolute maximum area rectangle in the defect-free fabrication space 210. The LECR is the largest area rectangle having horizontal boundaries parallel to the time axis, and vertical boundaries parallel to the PFill pressure axis, which we will denote as a horizontal rectangle for purposes of discussion. Ensuring that the LECR is limited to horizontal rectangles results in the PFill pressure and PFill duration times being independent of each other and therefore the PFill pressure, and/or PFill duration time may be independently tuned or changed within the LECR without any coupling of the PFill pressure and the PFill duration time or dependence of the PFill pressure on the PFill duration time, or vice versa. Accordingly, this simplifies the statistical regressions performed as part of the DOE process and may reduce the number of experiments required to complete the DOE process.

Figure 4:
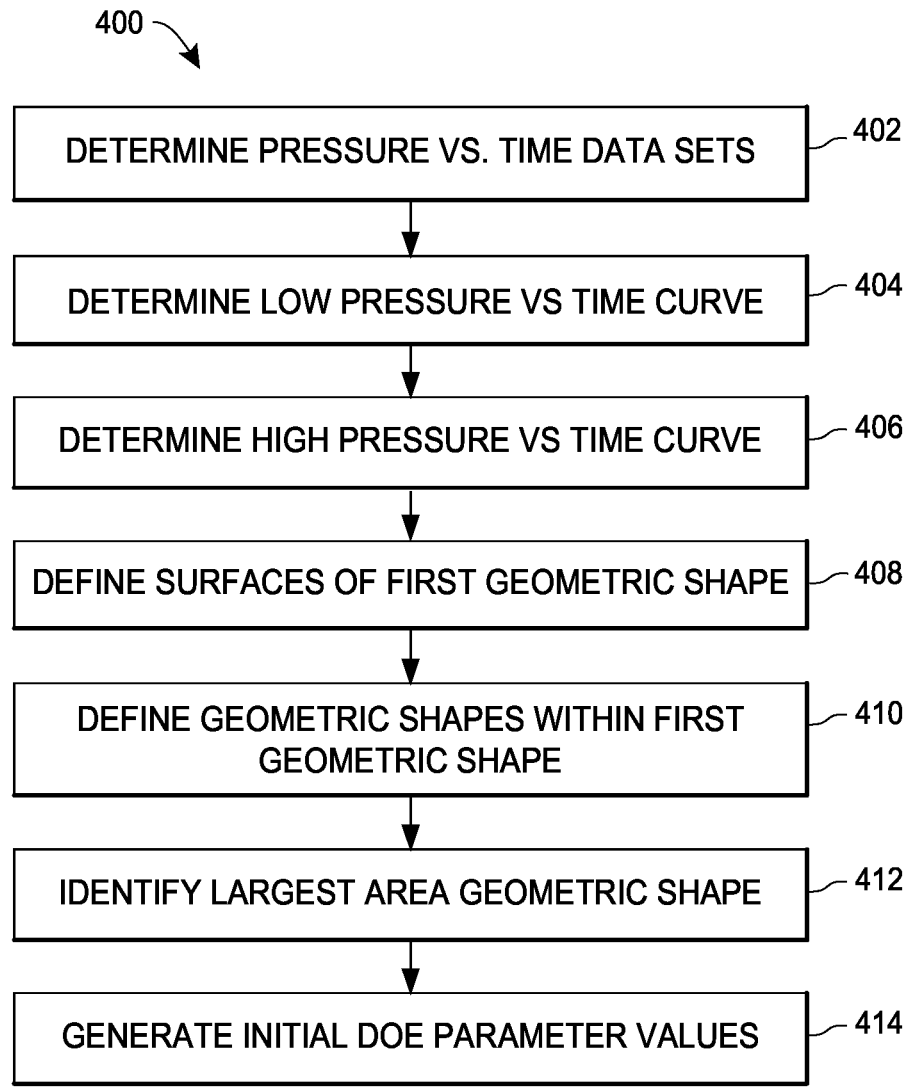
FIG. 4 is a flowchart illustrating an embodiment of a process for determining optimized parameters for an injection molding cycle according to LECR optimization.

FIG. 4 is a flowchart illustrating an embodiment of a process 400, performed by a processor of a computing device, such as the workstation computer 40 of FIG. 1, for determining optimized parameters for performing a DOE according to LECR optimization. FIG. 4 is a high level diagram presented here to provide a simplified description of the method which will be discussed in further detail herein. For example, several of the blocks and steps in FIG. 4 will be broken down into more detailed processes further in this disclosure. It should be appreciated that the process 400 is one example process for implementing the disclosed LECR techniques, and other embodiments may implement alternate processes, including those described elsewhere herein.

At block 402, the workstation computer 40 obtains a first plurality of pressure versus time data sets that define a low pressure versus time curve in pressure versus time coordinate space. The first plurality of pressure versus time data sets are indicative of fill step pressures and corresponding fill step times for a plurality of mold cycles performed by an injection molding machine, such as the injection molding apparatus 10 of FIG. 1. To obtain the first plurality of pressure versus time data sets, the workstation computer 40 may communicate with the controller 50 to configure the injection molding machine to perform the molding cycles having different control parameters for each mold cycle. Accordingly, the pressure versus time data sets are obtained by using an iterative process to vary the control parameters and obtain the corresponding measurements from the injection molding system 10.

Sensors may provide the pressure versus time data to the controller 50, and/or the workstation computer 40. The workstation computer 40 may then define the low pressure versus time curve in the pressure versus time coordinate space (i.e., the short-shot limit line 202 of FIG. 3) from the first plurality of pressure versus time data sets, or a subset thereof. In embodiments, the low pressure versus time curve may be defined or determined by the workstation computer 40 and the workstation computer 40 may configure the controller 50 to perform a low pressure versus time calibration cycle of the injection molding machine 10. The low pressure versus time calibration cycle may include the workstation computer 40 configuring the controller 50 with a plurality of parameter values for performing injection mold cycles. The controller 50 may control the injection molding machine 10 to perform the mold cycles, with each mold cycle having a corresponding fill step pressure and fill step time. The workstation computer 40 may store the fill step pressures and fill step times in a memory and define the low pressure versus time curve as a subset from the fill step pressure and fill step times stored in the memory. In embodiments, a user may enter parameter values at the workstation computer 40 for performing LECR optimization. For example, the workstation computer 40 may receive an indication via a user interface of the workstation computer 40 of a fill step pressure for an initial, or first mold cycle for determining the low pressure versus time curve. Additionally, the workstation computer 40 may identify a fill step time increment to increment the fill step time between consecutive mold cycles for determining the low pressure versus time curve, and further, the workstation computer 40 may define the fill step pressure and fill step time for each mold cycle of a plurality of mold cycles from the received first mold cycle fill step pressure, and the fill step time increment. In embodiments, the fill step time increment may be input by a user of the workstation computer 40, received by the workstation computer 40 from a memory or a network, or may be derived by the workstation computer 40 based on other parameters and/or factors.

At block 404, the workstation computer 40 obtains a second plurality of pressure versus time data sets that define a high pressure versus time curve in pressure versus time coordinate space. The workstation computer 40 may then define the high pressure versus time curve in the pressure versus time coordinate space (i.e., the flashing limit line 204 of FIG. 3) from the first plurality of pressure versus time data sets, or a subset thereof. In embodiments, the high pressure versus time curve may be defined or determined by the workstation computer 40 and the workstation computer 40 may configure the controller 50 to perform a high pressure versus time calibration cycle of the injection molding machine 10. The high pressure versus time calibration cycle may include the workstation computer 40 configuring the controller 50 with a plurality of parameter values for performing injection mold cycles. The controller 50 may control the injection molding machine 10 to perform the mold cycles, with each mold cycle having a corresponding fill step pressure and fill step time. The workstation computer 40 may store the fill step pressures and fill step times in a memory define the high pressure versus time curve as a subset from the fill step pressure and fill step times stored in the memory. In embodiments, a user may enter parameter values at the workstation computer 40 for performing LECR optimization. For example, the workstation computer 40 may receive an indication at a user interface of the workstation computer 40 of a fill step pressure for an initial, or first mold cycle for determining the high pressure versus time curve. Additionally, the workstation computer 40 may identify a fill step time increment to increment the fill step time between consecutive mold cycles for determining the high pressure versus time curve, and further, the workstation computer 40 may define the fill step pressure and fill step time for each mold cycle of a plurality of mold cycles from the received first mold cycle fill step pressure, and the fill step time increment. In embodiments, the fill step time increment may be input by a user of the workstation computer 40, received by the workstation computer 40 from a memory or a network, or may be derived by the workstation computer 40 based on other parameters and/or factors.

At block 406, the workstation computer 40 defines two surfaces of a first geometric shape, such as the defect-free fabrication space 210 of FIG. 3. The first surface is defined by the low pressure versus time curve, and the second surface being defined by the high pressure versus time curve. Additionally, a top surface of the geometric shape is defined by connecting the maximum pressure value data points of the first and second surface, and a bottom surface of the geometric shape is defined by connecting the minimum pressure values data points of the first and second surfaces. Therefore, the first geometric shape is defined by the first surface, second surface, top surface, and bottom surface.

At block 408, the workstation computer 40 defines a plurality of geometric shapes within the first geometric shape, and restricted by the first geometric shape in the pressure versus time coordinate space, as described in reference to FIG. 3.

At block 410, the workstation computer 40 identifies a second geometric shape being the geometric shape of the plurality of geometric shapes that has a largest area in the pressure versus time coordinate space, and at block 412, the workstation computer 40 generates DOE parameter values from the identified largest area geometric shape. The method may further include identifying, the workstation computer 40, a center point of the largest area geometric shape, such as the center point 214 of FIG. 3. As previously discussed, the center point 214 of the largest area geometric shape may provide parameter values for performing a DOE that are robust to mold cycle parameter fluctuations (e.g., temperature, pressure changes, etc.) and have a high likelihood of fabricating a part with minimal, or no defects (i.e., greater than 70%, greater than 80%, or greater than 90% likelihood). Additionally, the workstation computer 40 may identify a range of step time values and a range of step pressure values around the center point 214, and the workstation computer 40 may generate DOE parameter values from the identified ranges of step time and step pressure values. Further, the workstation computer 40 may provide the determined step time and step pressure values to the controller 50 for performing an injection mold cycle.

Each data point defining the boundaries, and within, the LECR are in general position (i.e., each data point has an independent set of step time and step pressure values) in the pressure versus time coordinate space. As one of ordinary skill in the art would recognize, a data point of the larger geometric shape defining the boundaries of the defect-free fabrication space (e.g., the space 210 of FIG. 3) is considered a support, or a contact, for a geometric shape contained within the defect-free fabrication space if a side or vertex of the restricted internal geometric shape is in contact with a boundary of the defect-free fabrication space. A geometric shape or polygon is considered to be a maximal size within the defect-free fabrication space if each side of the polygon or geometric shape is supported by a boundary of the defect-free fabrication space. Accordingly, in some embodiments, the LECR is determined by maximizing the size of each restricted rectangle within the defect-free fabrication space, and determining which of the maximally sized restricted rectangles (or other geometric shapes) has the greatest area. For example, as illustrated in FIG. 3, geometric shapes such as rectangles may have a first vertex being a data point on the low pressure versus time curve (i.e., the short-shot limit line 202) and a second vertex being a data point of the high pressure versus time curve (i.e., the flashing limit line 204).

FIGS. 5A, 5B, and FIGS. 6 through 8 are flowcharts of methods that may be performed by the workstation computer 40, controller 50, and injection molding system 12 for determining the short-shot limit line 202 (i.e., the low pressure vs time curve), the flashing limit line 204 (i.e., the high pressure vs time curve) and other parameters required for the performing LECR optimization of parameters for performing injection molding.

Figure 5A:
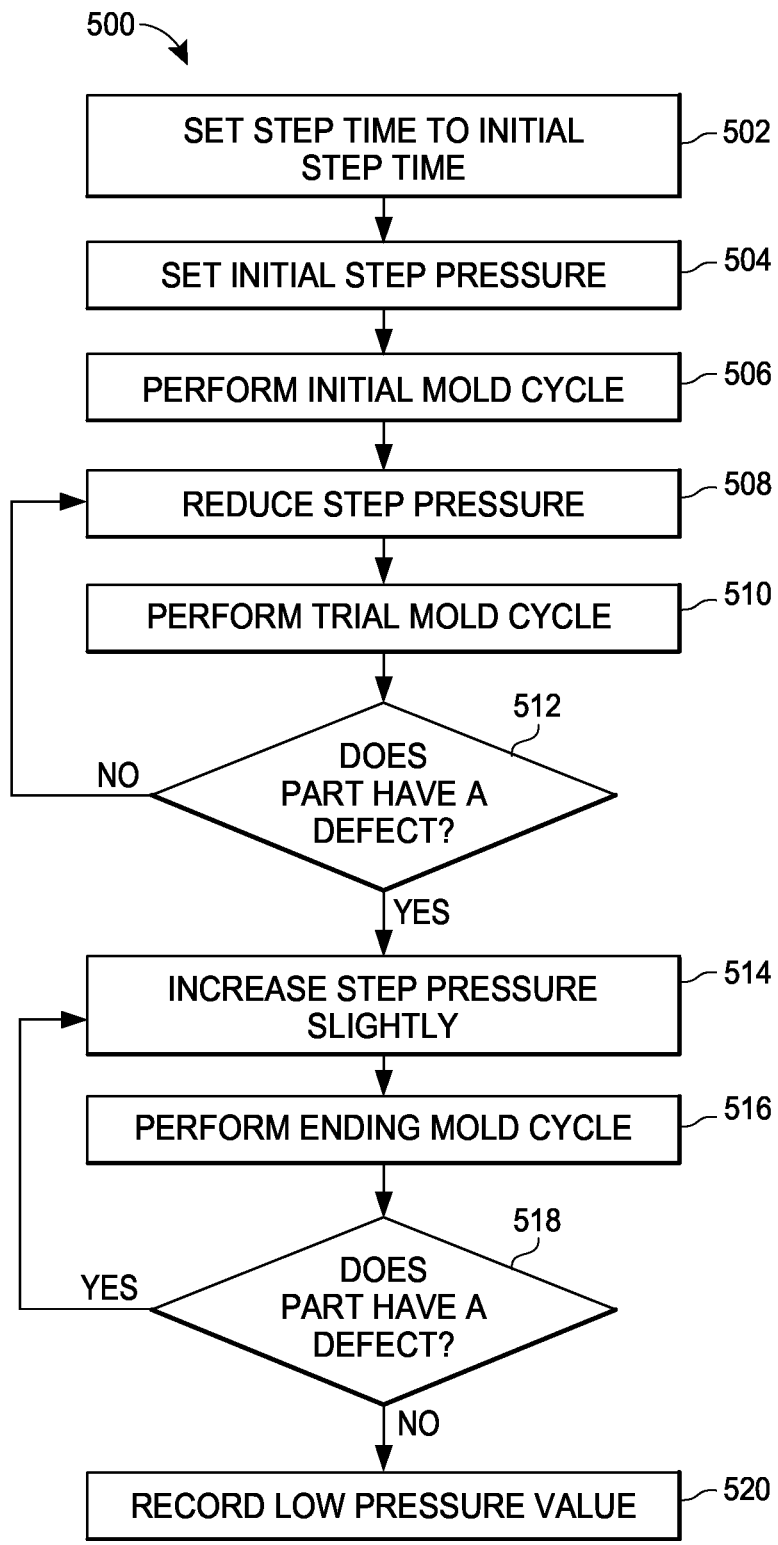
FIG. 5A is a flowchart of a method for determining the low pressure value for the Low-Low coordinate in pressure versus time space.
Figure 5B:
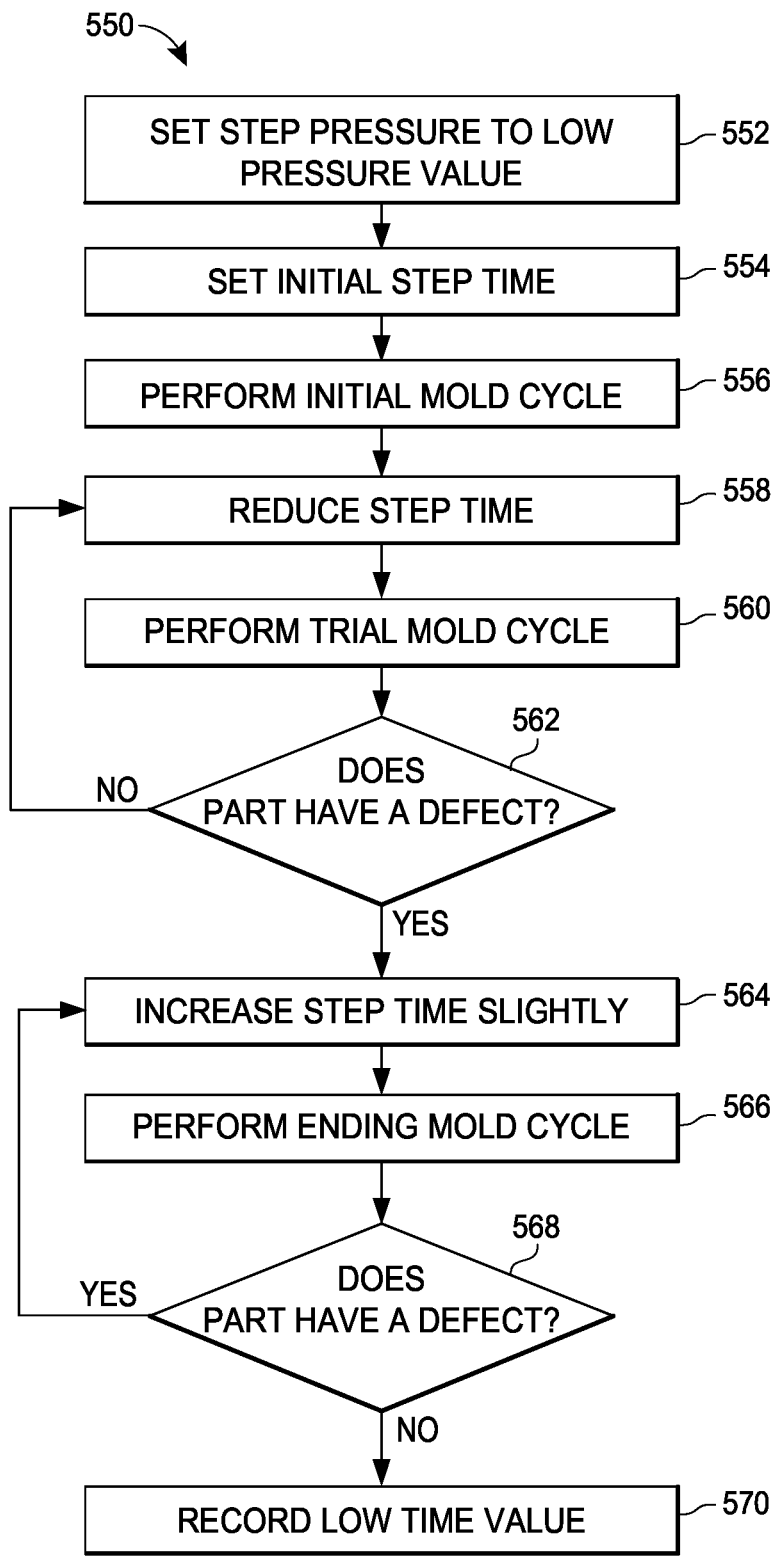
FIG. 5B is a flowchart of a method for determining the low step time value for the Low-Low coordinate in pressure versus time space.

FIGS. 5A and 5B are flowcharts for methods 500 and 550 that may be performed by the workstation computer 40 and controller 50 to control the injection molding system 12 to determine a low pressure at low step time coordinate (i.e., the Low-Low coordinate 220 of FIG. 3) in the pressure vs time coordinate space. The methods 500 and 550 may be performed as part of block 402 of the method 400 of FIG. 4 when obtaining the first plurality of pressure versus time data sets indicative of the low pressure versus time curve. The method 500 of FIG. 5A may be implemented by the workstation computer 40 to determine the pressure value for the Low-Low coordinate 220 of FIG. 3. At a block 502, the method 500 first includes the workstation computer 40 configuring the controller 50 with initial parameter values for performing an injection molding cycle. The workstation computer 40 sets the step time to an initial value that is greater than the time required to fill the mold. For example, if the determined pack and hold time is approximately 4 seconds, then setting the step time to 6 seconds or 8 seconds is adequate to fill the mold. By choosing a step time greater than the time required to fill the part, the step time is removed from being a possible source of defects during the fabrication allowing the lowest pressure point to be determined. A user may input the initial step time into the workstation computer 40 through a user interface of the workstation computer 40, or the initial step time may be retrieved by the workstation computer 40 from a memory or a network in communication with the workstation computer 40. A LECR optimization can configure the appropriate parameters and values for the controller 50.

At a block 504, the workstation computer 40 configures the controller 50 with an initial step pressure for executing an injection molding cycle. The initial step pressure should be a pressure value sufficiently high to fill the part at the given step time. For the profile shown in FIG. 2, the step pressure may be the PFill pressure. In other embodiments, the step pressure may be a PHold step pressure. Similarly, in embodiments that do not implement a reduced PHold pressure corresponding to portion 108 of FIG. 2, the step pressure may be the single step pressure value for pressure curve 102. The workstation computer 40 may determine the initial step pressure or the workstation computer 40 may retrieve the initial step pressure from a memory or a network in communication with the workstation computer 40. Alternatively, a user may input the initial step pressure into the workstation computer 40 through a user interface of the workstation computer 40.

At a block 506, the workstation computer 40 configures the controller 50 to perform an initial mold cycle by the injection molding apparatus 10. It is expected that the fabricated piece from the initial mold cycle is defect free. If the part fabricated by the initial mold cycle has defects, a new step time and step pressure is set that is sufficient for fabrication of defect-free parts given the specific mold geometries and injection molding system.

Once a defect-free part has been fabricated by the initial mold cycle, at a block 508 the workstation computer 40 determines a reduced step pressure and the workstation computer 40 provides the reduced step pressure to the controller 50. For example, if the initial step pressure is 13000 psi and the fabricated part does not exhibit any defects, than the pressure can be reduced to 12500 psi or 12000 psi depending on the amount of resolution required or desired for the LECR optimization. The step pressure may be reduced by an increment between 100 to 500 psi, between 500 to 1000 psi, between 1000 to 1500 psi, or by greater than 1500 psi. The pressure reduction may be determined by the difference of the highest pressure that forms a defect free part, to the lowest pressure that forms a defect free part (i.e., the pressure value of the low-high coordinate 222 and the pressure value of the low-low coordinate 220), divided by the number of points desired or required for a resolution of the LECR. For example, if the lowest defect free pressure is 5,000 and the highest defect free pressure is 10,000 and a resolution of 10 points is required for the LECR line, then increments of 500 psi may be used. The goal is to find how much wider the time tolerance is in relation to the pressure tolerance, typically lower pressures have a much larger time difference than the higher pressures. The workstation computer 40 may determine amount of step pressure reduction may or the workstation computer 40 may retrieved the step pressure reduction from a memory, or a network in communication with the workstation computer 40. Alternatively, a user may provide the workstation computer 40 with the reduced step pressure, or an amount for reducing the step pressure, through a user interface of the workstation computer 40.

At a block 510 the controller 50 controls the injection molding apparatus 10 to perform a trial mold cycle with the new step pressure. At a block 512, the fabricated part from the mold cycle is analyzed to determine if the part has a defect such as a short shot defect, sink marks, or another visual defect. The part may be visually or otherwise inspected by a user of the workstation computer 40. In embodiments, the part may be scanned for external and/or internal defects by imaging equipment and a system, such as the workstation computer 40, may analyze the scan results to determine if the part has a defect. If it is determined that the part does not have a defect ("No"), the method returns to block 508 where the workstation computer 40 further reduces the step pressure. At block 510 the controller 50 controls the injection molding apparatus 10 to perform a new trial mold cycle with the new step pressure, and the new part fabricated with the lower step pressure is examined to determine if the part has defects at block 512. This cycle is iterative until it is determined that a fabricated part has a defect ("Yes").

Once a part is determined to have a defect, at block 512, the workstation computer 40 increases the step pressure by an amount less than the most recent amount of step pressure decrease performed at block 514. For example, if at block 508 the step pressure was most recently decreased from 13000 psi to 12000 psi, then at block 514 the step pressure may be increased from 12000 psi to 12500 psi for the ending mold cycle. The resolution of the increase in pressure at block 514 may be smaller than the resolution of the reduction in pressure at block 508. The workstation computer 40 provides the new increased step pressure to the controller 50 for performing an injection molding cycle, and the controller 50 controls the injection molding apparatus 10 to perform an ending mold cycle at block 516.

At block 518 the part is examined to determine if the part has any defects. As previously discussed, the part may be analyzed by a user for visual indications of defects, and/or by a sensor system and associated workstation computer 40 or processor for determining if the fabricated part has defects. If the part has a defect ("Yes"), then the method 500 returns to block 514 and the workstation computer 40 increases the step pressure again.

Upon returning to block 514, the workstation 40 increases the step pressure to a value between the previous step pressure and the last step pressure used in a trial mold cycle that produced a part with no defects. Additionally, the change in the step pressure may be determined by a given pressure tolerance or error tolerance of the injection molding system for fabricating parts with few or no defects. For example, if a part was fabricated with no defects at 13000 psi, and the current ending mold cycle produced a part with defects at 12500 psi, then the step pressure may be increased to 12600 psi, 12750 psi, 12800 psi, or another pressure value below 13000 psi. Once the workstation computer 40 has provided the new step pressure to the controller 50, the controller 50 controls the injection molding apparatus 10 to perform another ending mold cycle at block 516 and the resultant fabricated part is examined for defects at block 518. Alternatively, if at block 518 a part is determined to be defect free ("No"), then the most recent step pressure used in an ending mold cycle is determined to be the low pressure value required for the LECR optimization and the workstation computer 40 records the low pressure value in a memory or otherwise stores the low pressure value.

In embodiments, to further refine the low pressure value, if at block 518 it is determined that the part is defect free ("No"), then the workstation computer 40 may return to block 508 and decrease the pressure by an even smaller resolution and similarly increase the pressure at block 514 by an even smaller resolution. As a result, the workstation computer 40 may determine the pressure value of the Low-Low coordinate 220 with more accuracy. Increasing the accuracy of the Low-Low coordinate 220 may be required or desired for certain injection molding systems that require operation within certain pressure tolerances and/or error tolerances for fabricating defect-free, or minimal defect parts.

In FIG. 5B, the method 550 may be implemented by the workstation computer 40 to determine the step time value for the low pressure at low step time coordinate, the Low-Low coordinate 220. At a block 552, the method 550 first includes the workstation computer 40 providing initial parameter values to the controller 50 for performing an injection molding cycle. The workstation computer 40 sets the step pressure to the low pressure value determined in method 500. The step pressure will remain at the low pressure value for the rest of method 550 to isolate the low step time value. At a block 554, the workstation computer 40 provides an initial step time to the controller 50. In embodiments, the initial step time may be the same value as the step time used for method 500, i.e., 8 seconds. In other embodiments, the initial step time may be a time less than the step time used for method 500, but greater than a step time that is able to achieve a cavity pressure response. For example, if a step time of 5 seconds achieves a cavity pressure response, than the initial step time may be 7 seconds, 6 seconds, 5.5 seconds, or another step time between 5 seconds and 8 seconds. The workstation computer 40 may determine the initial step time or the workstation computer 40 may retrieve the initial step time from a memory or a network in communication with the workstation computer 40. Alternatively, a user may input the initial step time into the workstation computer 40 through a user interface of the workstation computer 40.

At a block 556, the workstation computer 40 configures the controller 50 to perform an initial mold cycle by the injection molding apparatus 10. It is expected that the fabricated piece is defect free. If the piece is not defect free, a new, greater step time may be used as the initial step time. The new step time may be determined by a step time increment value may be determined by a processor, retrieve by a controller or processor from a memory or other machine readable media, or provided by a user.

Once a defect-free part has been fabricated by the initial mold cycle, at a block 558 the workstation computer 40 determines a reduced step time and the workstation computer 40 provides the reduced step time to the controller 50. For example, if the initial step time is 8 seconds, and the fabricated part does not exhibit any defects, than the workstation computer 40 can reduce the step time to 7 seconds or 6 seconds depending on the amount of resolution required or desired for the LECR optimization. Additionally, the step time reduction, or resolution, may be determined by an error threshold or step time operational threshold of the injection molding apparatus 10. The workstation computer 40 may determine the reduced step time or the workstation computer 40 may retrieve the reduced step time from a memory or a network in communication with the workstation computer 40. Alternatively, a user may input the reduced step time into the workstation computer 40 through a user interface of the workstation computer 40.

At a block 560 the controller 50 controls the injection molding apparatus 10 to perform a trial mold cycle with the new step time. At a block 562, the fabricated part from the mold cycle is analyzed to determine if the part has a defect such as a short shot defect, sink marks, or another visual defect. The part may be visually or otherwise inspected by a user of the workstation computer. In embodiments, the part may be scanned for external and/or internal defects by imaging equipment and a system, such as the workstation computer 40, may analyze the scan results to determine if the part has a defect. If it is determined that the part does not have a defect, then the method 550 returns to block 558 where workstation computer 40 further reduces the step time. At block 560 the controller 50 controls the injection molding apparatus 10 to perform a new mold cycle with the new step pressure, and the new part fabricated with the lower step pressure is examined to determine if the part has defects at block 562. This cycle is iterative and continuous until it is determined that a fabricated part has a defect.

Once a part is determined to have a defect, the workstation computer 40 increases the step time at block 564. The step time increase should be less than the most recent amount of step time decrease performed at block 566, and an ending mold cycle is performed at the increased step time at block 516. For example, if at block 558 the workstation computer 40 most recently decreased the step time from 8 seconds to 6 seconds, then at block 564 the workstation computer may increase the step time from 6 seconds to 6.5 seconds for the ending mold cycle. The workstation computer 40 provides the new increased step time to the controller 50 for performing an injection molding cycle, and the controller 50 controls the injection molding apparatus 10 to perform an ending mold cycle at block 566.

At block 568 the part is examined to determine if the part has any defects. As previously discussed, the part may be analyzed by a user for visual indications of defects, and/or by a sensor system and associated workstation computer 40 or processor for determining if the fabricated part has defects. If the part has a defect ("Yes") then the method 550 returns to block 564 and the workstation computer 40 increases the step time again. The step time should not be increased to a value above the last step time used in a trial mold cycle that produced a part with no defects. Additionally, the change in the step time may be determined by a given step time tolerance or error tolerance of the injection molding system for fabricating parts with few or no defects. For example, if a part was fabricated with no defects at 8 seconds, and the current ending mold cycle produced a part with defects at 6.5 seconds, than the step time may be increased to 6.75 seconds, 7 seconds, 7.5 seconds, or another time value below 8 seconds. Once the workstation computer 40 has provided the new step time to the controller 50, the controller 50 controls the injection molding apparatus 10 to perform another ending mold cycle at block 566 and the resultant fabricated part is examined for defects at block 568. Alternatively, if at block 568 a part is determined to be defect free, then, at block 570 the most recent step time used in an ending mold cycle is determined to be the low time value required for the LECR optimization and the workstation computer 40 records the low pressure value in a memory or otherwise stores the low pressure value. The low pressure value and the low time value together represent the low pressure at low step time point of the defect-free fabrication zone, otherwise referred to herein as the Low-Low coordinate 220.

In embodiments, to further refine the low time value, if at block 568 it is determined that the part is defect free ("No"), then the workstation computer 40 may return to block 558 and decrease the step time by an even smaller resolution, and similarly increase the step time at block 564 by an even smaller resolution. As a result, the workstation computer 40 may determine the time value the more accuracy. Increasing the accuracy of the Low-Low coordinate 220 may be required or desired for certain injection molding systems that require operation within certain time tolerances and/or error tolerances for fabricating defect-free, or minimal defect parts.

Figure 6:
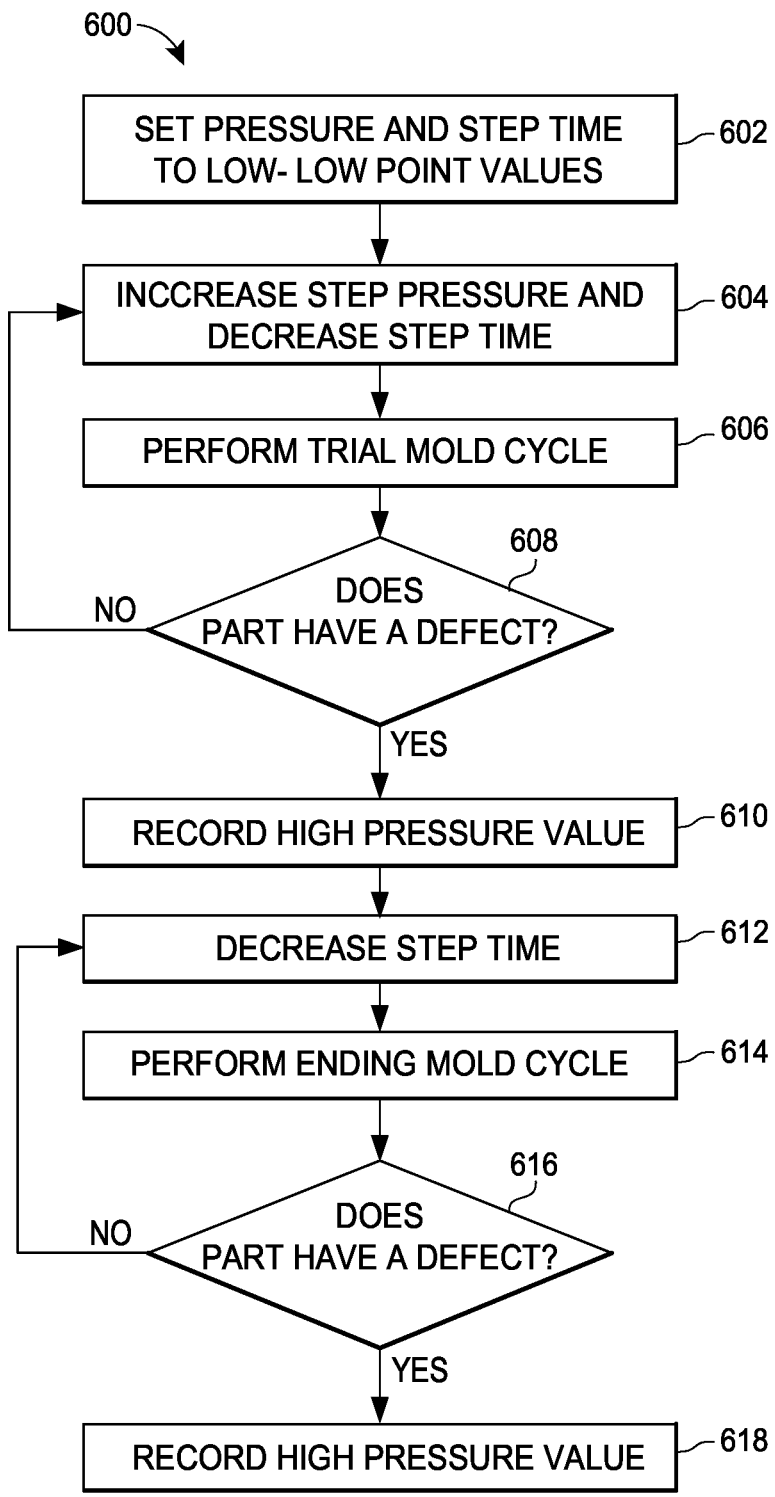
FIG. 6 is a flowchart of a method for determining the pressure and time value for the High-Low coordinate in pressure versus time space.

FIG. 6 is a flowchart of a method 600 for determining the high pressure and low step time point coordinate LECR optimization (i.e., the Low-High coordinate 222 the defect-free fabrication space 210 of FIG. 3). The method 600 may be performed as part of the method 400 for obtaining the first plurality of pressure versus time data sets at block 402, and for determining the low pressure versus time curve. The method 600 begins, at block 602 with the workstation computer 40 setting the step time and step pressure of the controller 50 to the Low-Low coordinate 220 values determined by the methods 500 and 550 of FIGS. 5A and 5B. At block 604, the workstation computer 40 increases the pressure value provided to the controller 50, and the workstation computer 40 reduces the step time provided to the controller 50. In embodiments, a user may identify a pressure and/or time increase, or the controller 50 may determine the pressure and/or time increase based on other indicators such as step times, step pressure, etc. The step time should be reduced to reduce the chance of overpack or flash, dependent upon the step pressure window for the given system and mold geometries. The workstation computer 40 may increase the step pressure by between 100 and 500 psi, between 250 and 750 psi, between 500 and 1000 psi, by greater than 1000 psi, or by another pressure amount dependent upon the required or desired resolution of the defect-free fabrication space and the LECR optimization. Each of the pressure values determined by the workstation computer 40 and used for mold cycles are referred to herein as pressure steps.

At block 606, the controller 50 controls the injection molding apparatus 10 to perform a trial mold cycle. At block 608 the part is examined for defects. As previously discussed, the part may be analyzed by a user for visual indications of defects, and/or by a sensor system and associated workstation computer 40 or other processor for determining if the fabricated part has defects. If it is determined that the part has no defect ("No") than the method 600 returns to block 604 and the workstation computer 40 increases the step pressure, and decreases the step time again. The workstation computer 40 provides the new step pressure and step time to the controller 50, and the controller 50 controls the injection molding apparatus 10 to perform a new trial mold cycle at block 606. The newly molded piece is checked for defects at block 608. The process is performed iteratively until a piece is molded that is determined to have defects. LECR optimization may be performed using 3, 4, or 5 or more iterations of the currently described cycle as desired or required. If, at block 608, it is determined that the piece has a defect ("Yes"), than the pressure value used in the most recent trial mold cycle is determined to be the high pressure value and is recorded or stored at block 610. Alternatively, if at block 608 it is determined that the piece has a defect, the workstation computer 40 may determine other pressure values for performing mold cycles that may increase the resolution of the Low-High coordinate 222.

At block 612 the workstation computer 40 maintains the step pressure at the high pressure value while the workstation computer 40 decreases the step time and provides the new step time to the controller 50 for performing additional mold cycles. At block 614, the controller 50 controls the injection molding apparatus 10 to perform an ending mold cycle. The resulting molded part is examined for defects at block 616. If the part is determined not to have any defects, the method returns to block 612 and the workstation computer 40 further reduces the step time.

The workstation computer 40 provides the further reduced step time to the controller 50, and at block 614, the controller 50 controls the injection molding apparatus 10 to perform a new ending mold cycle. The newly fabricated piece is examined for defects at block 614. This cycle is performed iteratively until it is determined that the fabricated piece has a defect. If, at block 614, it is determined that the piece has a defect then the workstation computer 40 stores or otherwise records the current step time used for the most recent ending mold cycle at block 616. Alternatively, if at block 614 it is determined that the piece has a defect, the workstation computer 40 may determine other time values for performing mold cycles that may increase the resolution of the Low-High coordinate 222 and the workstation computer 40 may store or record the higher resolution time value. The recorded high pressure value and low step time, in method 600, represent the High-Low coordinate 222 of the defect-free fabrication zone 210. Over the entirety of the method 600 it may be desirable to span pressures across a 5000 psi range, 3000 psi range, 2000 psi range, or another psi range dependent on the molding system, mold geometries, and materials used for the part. In some embodiments, a pressure range of greater than 1000 psi may be required to perform LECR optimization as described herein.

For clarity and simplification, the pressure values used in the method 600 may be referred to as the Low-Low pressure (i.e., low pressure value), first pressure step, second pressure step, third pressure step, and so on, ending at the High-Low pressure value (i.e., the high pressure value) with the number of pressure steps being determined by the number of iterations performed by the upper loop (blocks 604, 606, and 608) in method 600. In the following discussion a set number of iterations or any iterative method cycles may be used, but it should be understood that specific numbers of cycles or iterations are used only for clarity and for discussion, and that any number of resolutions, iterations, or cycles may be used or performed for the methods described herein.

Figure 7:
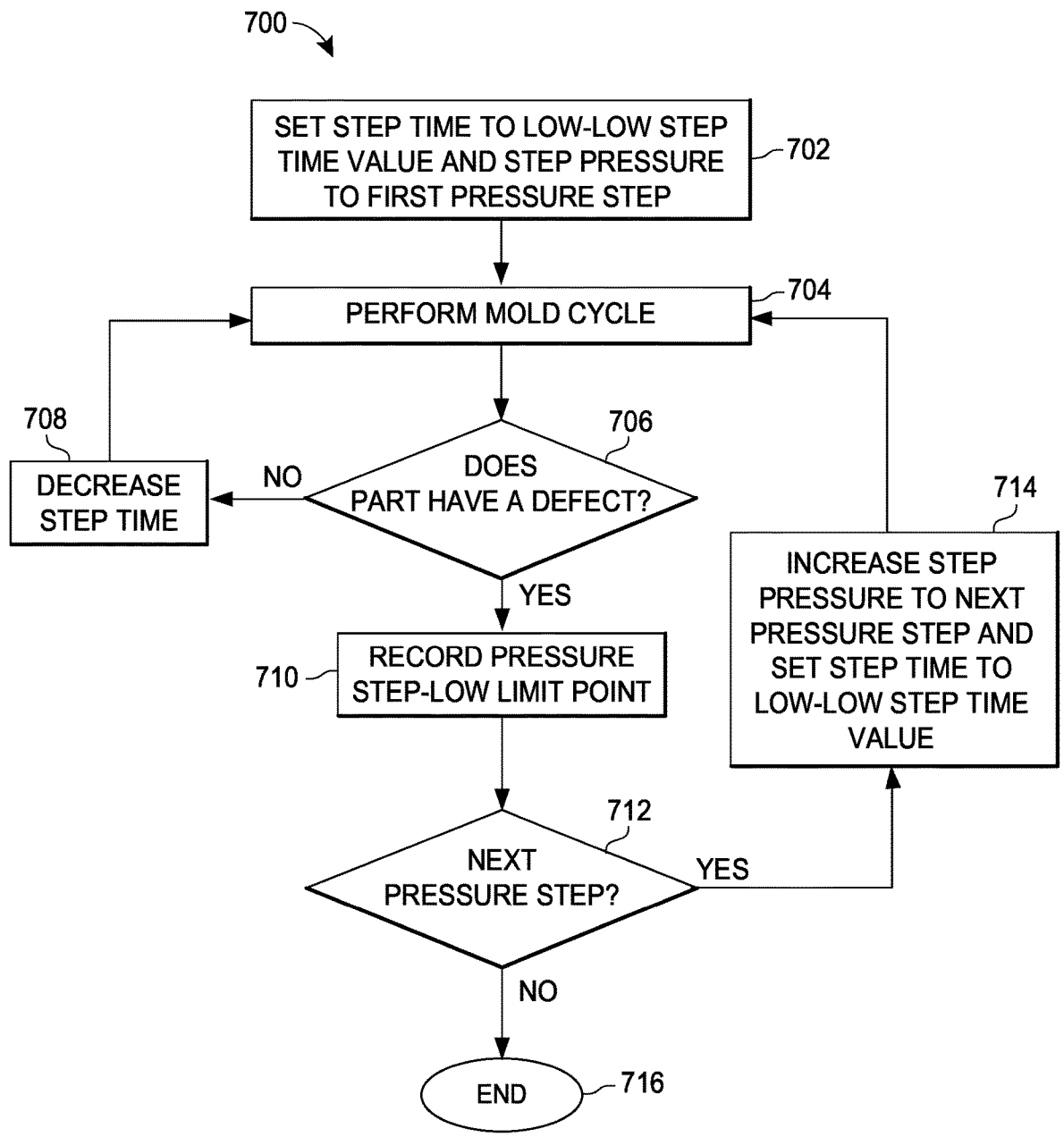
FIG. 7 is a flowchart of a method for determining low step times for each of the step pressures of the method of FIG. 6.

FIG. 7 is a flowchart of a method 700 for determining low step times for each of the step pressures of method 600. The completed data set including low step times and step pressures may be considered to be a pressure versus time data set that defines the low pressure vs time curve. As such, the methods of FIGS. 5A, 5B, 6 and 7 may together be considered to describe an embodiment of a method for performing part of the method 400 of FIG. 4, and specifically for obtaining the first plurality of pressure versus time data sets at block 402, and for determining the low pressure versus time curve. At block 702 the workstation computer 40 sets the step time to the Low-Low step time and the workstation computer 40 sets the step pressure to the first pressure step (i.e., the first pressure step is the first pressure of method 600 that is greater than the Low-Low step pressure).

The workstation computer 40 provides the controller 50 with the step time and step pressure, and at block 704, the controller 50 controls the injection molding apparatus 10 to perform a mold cycle. The resultant piece is examined for defects at block 706. If it is determined that piece does not have a defect ("No") then the workstation computer 40 reduces the step time at block 708. The workstation computer 40 provides the reduced step time to the controller 50, and the controller 50 controls the injection molding apparatus 10 to perform a new mold cycle at block 704. The new piece is then examined for defects at block 706. If it is determined that the piece has a defect ("Yes"), then the workstation computer 40 records the current step time and step pressure stores these values as a first pressure-time low limit data point at block 710.

The workstation computer 40 then checks if low step times have been determined for all of the first, second, third, etc. pressure steps 712. If the workstation computer 40 determines that not all of the low step times have been determined ("Yes"), then the workstation computer increases the pressure to the pressure value of the next pressure step and the workstation computer 40 sets the step time to the Low-Low step time value, at block 714. The method 700 returns then to block 704 for the workstation computer 40 to determine and store the low step time for the next pressure step. As such, the method 700 iteratively determines low step times for each of the pressure steps. If, at block 712, the workstation computer 40 determines that there are no next pressure steps, or that the next pressure step is the high pressure value ("No"), then the method 700 ends at block 716 with the workstation computer 40 having determined and stored low step times for each of the pressures of the pressure steps.

Figure 8:
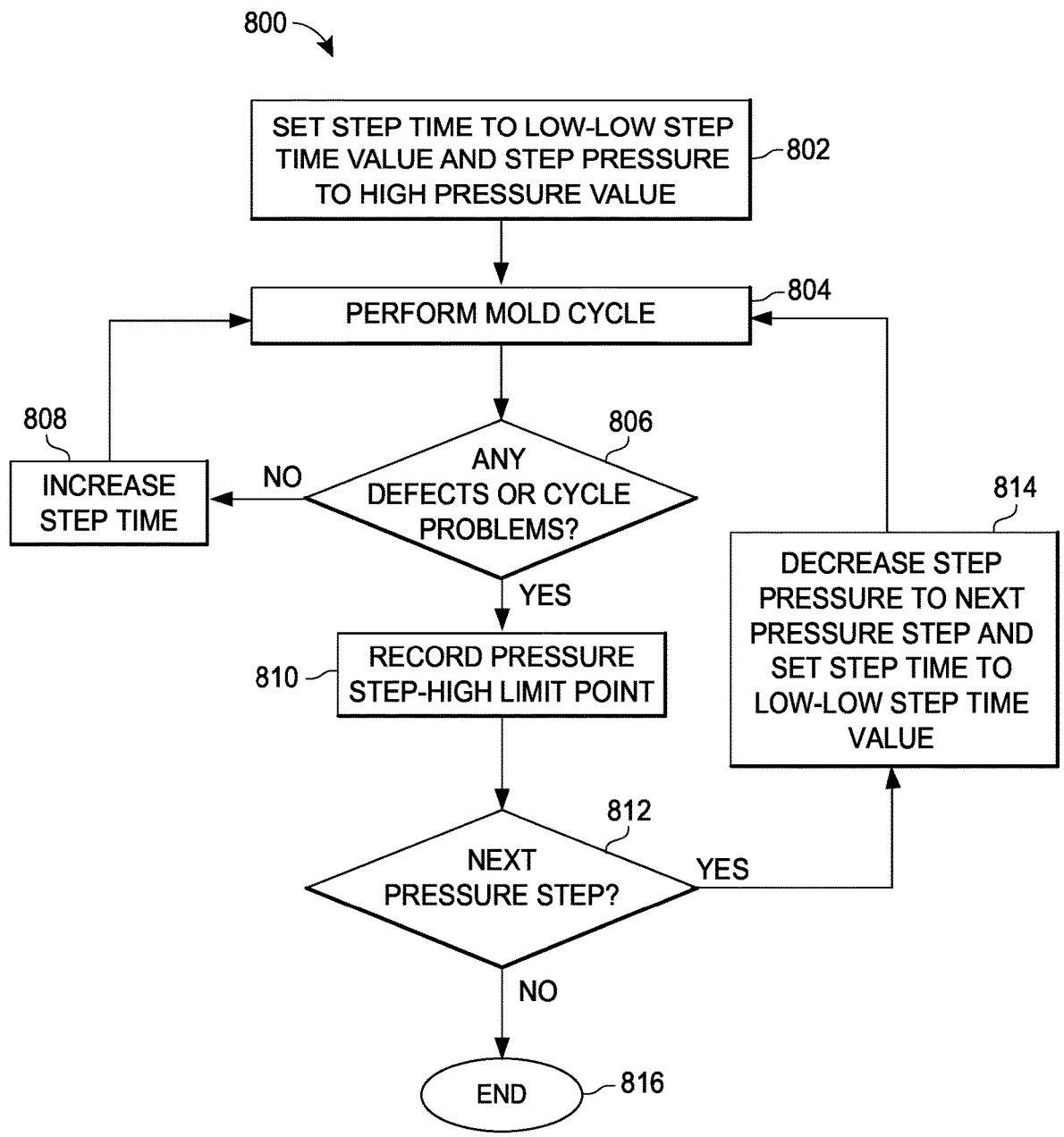
FIG. 8 is a flowchart of a method for determining high step times for each of the step pressures of the method of FIG. 6.

FIG. 8 is a flowchart of a method 800 for determining high step times for each of the step pressures of method 600. The completed data set including high step times and step pressures may be considered to be a pressure versus time data set that defines the high pressure vs time curve, i.e., the flash limit line 204 of FIG. 3. As such, the methods of FIG. 8 may be considered to describe an embodiment of a method for performing part of the method 400 of FIG. 4, and specifically for obtaining the second plurality of pressure versus time data sets at the block 404, and determining the high pressure versus time curve.

At block 802 the workstation computer 40 sets the step time to the Low-Low step time value and the workstation computer 40 sets the step pressure to the high pressure value of the High-Low coordinate 222. The workstation computer 40 provides the controller 50 with the step time and step pressure, and at block 804, the controller 50 controls the injection molding apparatus 10 to perform a mold cycle. The resultant piece is examined for defects or injection cycle problems are detected by the controller 50 and/or the workstation computer 40 at block 806. Defects may include or be due to injection issues, visual defects, or that the pieces weight stops increasing at a certain point. If it is determined that the piece does not have a defect or that there were no mold cycle issues ("No"), the workstation computer 40 increases the step time at block 808. The workstation computer 40 provides the increased step time to the controller 50, and at block 804, the controller 50 controls the injection molding apparatus 10 to perform a new injection mold cycle. The new piece is examined at block 806 to determine if the new piece has any defects. If it is determined that the piece has a defect or that there were mold cycle problems ("Yes"), then, at block 810, the workstation computer 40 records or otherwise stores the previous step time and step pressure as the high-pressure high-step time data point as the High-High coordinate 224 of FIG. 3. The high-step time value recorded is also referred to as the gate seal time for the current pressure step.

The workstation computer 40 then checks if high step times have been determined for all of the first, second, third, etc. pressure steps 812. If the workstation computer 40 determines that not all of the low step times have been determined ("Yes"), then the workstation computer 40 decreases the pressure to the pressure of the next lower pressure step and the workstation computer 40 sets the step time to the previous pressure step's gate seal time value at block 814 and the method returns to block 804 for the workstation computer 40 to determine and store the high step time for the next pressure step.

The method 800 enables the workstation computer 40 to iteratively determine high step times for each of the pressure steps. After the workstation computer 40 determines the high-step time value for the Low-Low pressure value (that is, there are no next pressure steps remaining) ("No"), the workstation computer 40 proceeds to block 816 where the method 800 ends with the workstation computer 40 having determined and stored low step times for each of the pressure values of the pressure steps. The determined highest step pressure value and corresponding high step time are the pressure and time values of the High-High coordinate 224, and the low step pressure value and corresponding high step time are the pressure and time values of the Low-High coordinate 226 of FIG. 3.

As illustrated by the defect-free fabrication space 210 of FIG. 3, lines can be interpolated between the various pressure step points, the Low-Low coordinate 220, the High-Low coordinate 222, the High-High coordinate 224, and the Low-High coordinate 226. In embodiments, the workstation computer 40 may perform a mathematical regression to interpolate the lines between the pressure step points. For example, the regression may include a piecewise interpolations, a linear interpolation, a polynomial interpolation, a spline interpolation, or another mathematical interpolation regression. The resultant curve between the Low-Low point, and the High-Low point may be the Short-Shot limit line 202 of FIG. 3, and the low pressure versus time curve determined at block 402 of the method 400 of FIG. 4. Additionally, the resultant curve between the Low-High coordinate 226 and the High-High coordinate 224 may be the flashing limit line 204, and the high pressure versus time curve determined at block 404 of the method 400 of FIG. 4. As previously described, the workstation computer 40 may then determine rectangles having vertices at any of the Low-Low coordinate 220, High-Low coordinate 222, Low-High coordinate 226, High-High coordinate 224, any of the pressure steps, or any of the interpolated line boundaries. The workstation computer 40 may then determine the largest area rectangle, or multiple rectangles and corresponding center points, and the workstation computer 40 further analyze or otherwise use the determined rectangles for performing LECR optimization as described herein.

Figure 9:
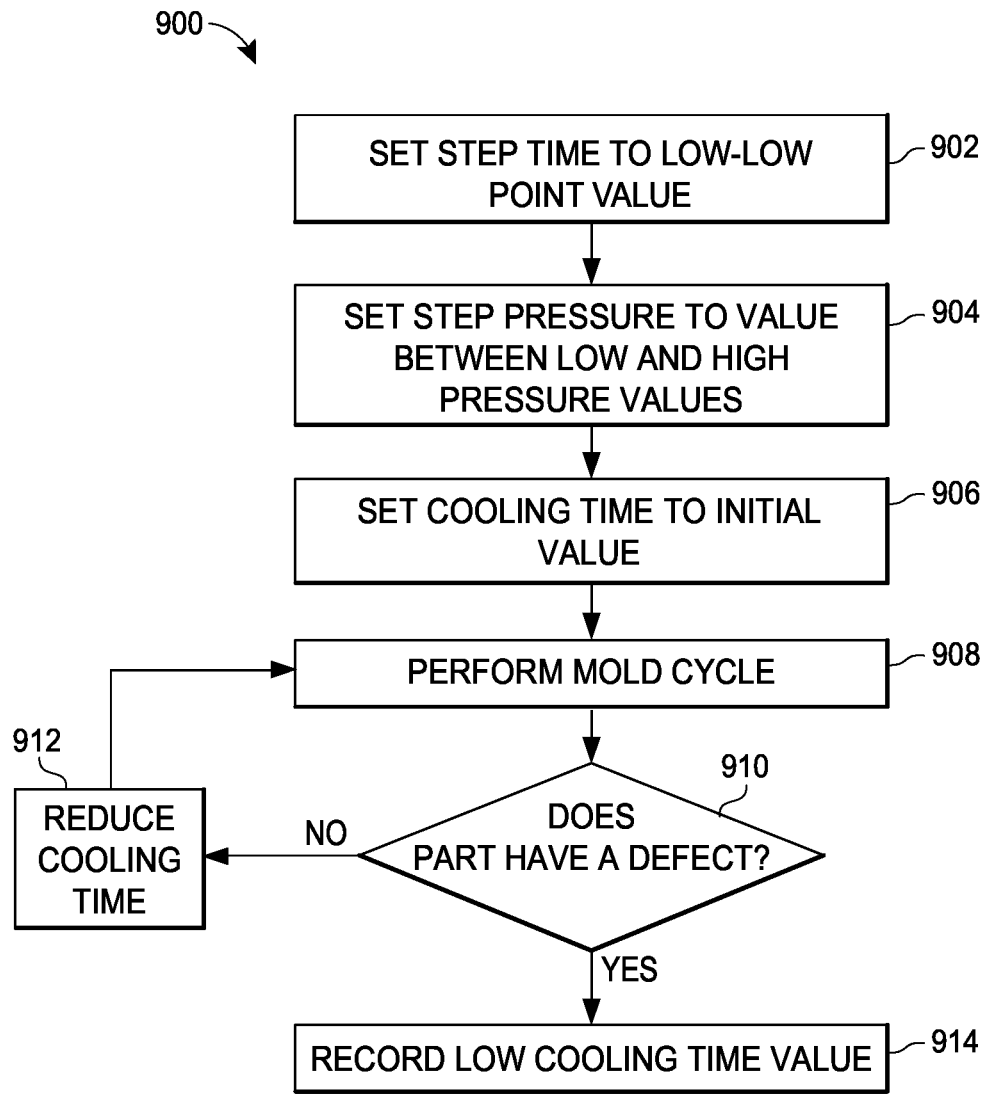
FIG. 9 is a flowchart of a method for determining a cooling time range for an injection mold cycle according to LECR optimization.

FIG. 9 is a flowchart of a method 900 for determining a cooling time range for an injection mold cycle. The method 900 includes the workstation computer 40 setting the step time to the Low-Low coordinate 220 step time value at block 902, and the workstation computer 40 setting the step pressure to a value between the Low-Low coordinate 220 pressure value, and the High-Low coordinate 222 pressure value at block 904. In embodiments, the workstation computer 40 may set the initial step time and initial step pressure to values determined or otherwise derived from by the LECR optimization. The workstation computer 40 may determine multiple cooling time data sets including multiple step time values and step pressure values defined by the LECR optimization to determine the cooling time range. In any embodiment, the workstation computer 40 sets the initial cooling time for an amount of time that ensures that the piece has cooled properly without forming defects at block 906. For example, the workstation computer 40 may set the cooling time to 8 seconds, and provide the 8 second cooling time to the controller 50 for performing an injection mold cycle. The controller 50 may control the injection molding apparatus 10 to perform a mold cycle at block 908. The fabricated piece is inspected for defects at block 910. If it is determined that the piece has a no defects ("No"), the workstation computer 40 reduces the cooling time at block 912, and the method returns to block 908 and the controller 50 controls the injection molding apparatus 10 to perform another mold cycle with the reduced cooling time.

At block 914 the newly fabricated piece is inspected to determine if the newly fabricated piece has a defect. If it is determined that the fabricated piece has a defect ("Yes") than the workstation computer 40 records or otherwise stores the low cooling time block 914, with the low cooling time being one of the cooling times from the determined cooling time data sets. A defect may include extreme warp, an ejection issue, push pins, heat sinks, or another visual or mechanical error or defect that may appear or occur.

Once the low cooling time has been established the workstation computer 40 may determine a high cooling time to define a cooling time range between the low cooling time and the high cooling time. In embodiments, the workstation computer may determine the high cooling time to be three time larger than the low cooling time. For example, if the low cooling time is determined to be 2 seconds than the high cooling time may be chosen to be 6 seconds. In embodiments, the high cooling time may be chosen or determined based on a desired speed of manufacturing or demand for pieces fabricated by mold cycles. The workstation computer 40 may determine the high cooling time or the workstation computer 40 may retrieve the high cooling time from a memory or a network in communication with the workstation computer 40. Alternatively, a user may input the high cooling time into the workstation computer 40 through a user interface of the workstation computer 40. Further, the high cooling time may be a cooling time indicated by one of the data points in the cooling time data sets. The determined cooling time range may be stored or communicated to a system to allow for an injection mold system to perform mold cycles with cooling times in the cooling time range. Further, the workstation computer 40 may provide the cooling time range to the controller 50, and the controller 50 may control the injection molding apparatus 10 to perform an injection mold cycle according to the cooling time range.

Figure 10:
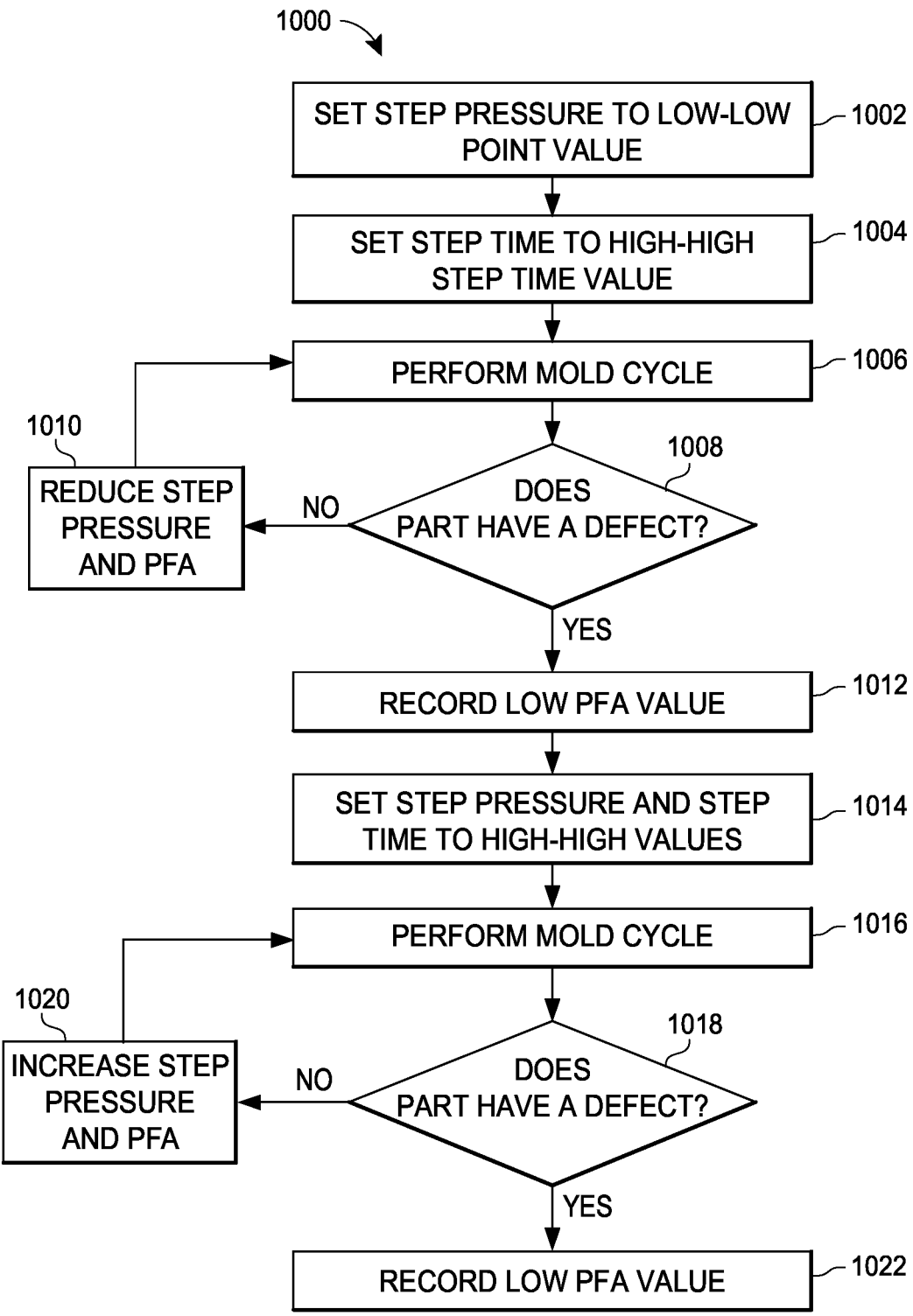
FIG. 10 is a flowchart of a method for determining a range of pressure process factors (PFAs) according to LECR optimization.

FIG. 10 is a flowchart of a method 1000 for the workstation computer 40 to determine a range of pressure process factor As (PFAs) from a set of obtained PFA data sets. PFA is a multiplier to the amount of cavity pressure measured in the mold and the PFA is used in conjunction with the cavity pressure to adjust a plastic melt pressure setpoint. In other words, if the cavity pressure starts to increase, the plastic melt pressure setpoint will decrease or increase by an amount calculated by the algorithm using a PFA determined during initial process development. The process factor is part and material dependent. As cavity pressure is measured, an adjustment to the melt pressure set point takes place based on the PFA multiplier that is typically determined during validation of the process. The PFA can be adjusted as necessary to make a quality part. The PFA data sets correspond to data points defining the boundaries of the identified rectangle or other geometric shape having the largest are in the pressure versus time space. The method 1000 includes the workstation computer 40 setting the initial step pressure of the controller 50 to the Low-Low coordinate 420 pressure value at block 1002, and the workstation computer 40 setting the initial step time of the controller to the High-High coordinate 224 step time value at block 1004. In embodiments, the workstation computer 40 may set the initial step time and step pressure to values determined by the LECR optimization process. The workstation computer 40 may configure the controller 50 to use multiple PFA data sets including multiple step time values and step pressure values defined by the LECR to perform mold cycles to determine a PFA range.

The workstation computer 40 provides the initial step time and initial step pressure to the controller 50, and, at block 1006, the controller 50 controls the injection molding apparatus 10 to perform a mold cycle. The resultant piece is examined to determine if the piece has a defect at block 1008. If it is determined that the piece does not have a defect ("No") then the workstation computer 40 reduces the step pressure at block 1010, which also causes a reduction of the PFA. A defect may include a short shot, sink mark, or another visible, or on visible, defect or issue with the piece. If it is determined that the piece has a defect ("Yes") then the workstation computer 40 records or otherwise stores the low PFA at block 1012, with the low PFA value being a value indicated by one of the data points in the pressure process factor data sets. To validate the low PFA value, the workstation computer 40 may configure the controller 50 to control the injection molding apparatus 10 to perform a mold cycle with the low PFA and the Low-Low step time values. Validating the low PFA value ensures that the low PFA value can be used during mold cycles to fabricate defect free pieces for the range of step time values from the Low-Low coordinate 220 step time value to the High-High coordinate 124 step time value.

The method 1000 further includes the workstation computer 40 setting the step pressure and step time to the High-High coordinate 224 step pressure and step time values at block 1014. The workstation computer 40 provides the High-High coordinate 224 step pressure and step time values to the controller 50, and the controller 50 controls the injection molding apparatus 10 to perform a mold cycle at block 1016. The resultant piece is examined for defects at block 1018. If the piece is determined not to have a defect ("No") then the workstation computer 40 increases the step pressure at block 1020, which increases the PFA. The workstation computer 40 provides the increased step pressure to the controller 50, and the controller 50 controls the injection molding apparatus 10 to perform a new mold cycle.

If it is determined at block 1018 that a piece has a defect ("Yes") then the workstation computer 40 stores the high PFA value at block 1022, with the high PFA value being a value indicated by one of the data points in the pressure process factor data sets. The workstation computer 40 may then determine that the operable PFA range is the range of PFA values between the low PFA value and the high PFA value. Further, the workstation computer 40 may provide the PFA range to the controller 50, and the controller 50 may control the injection molding apparatus 10 to perform an injection mold cycle according to the cooling time range.

Figure 11:
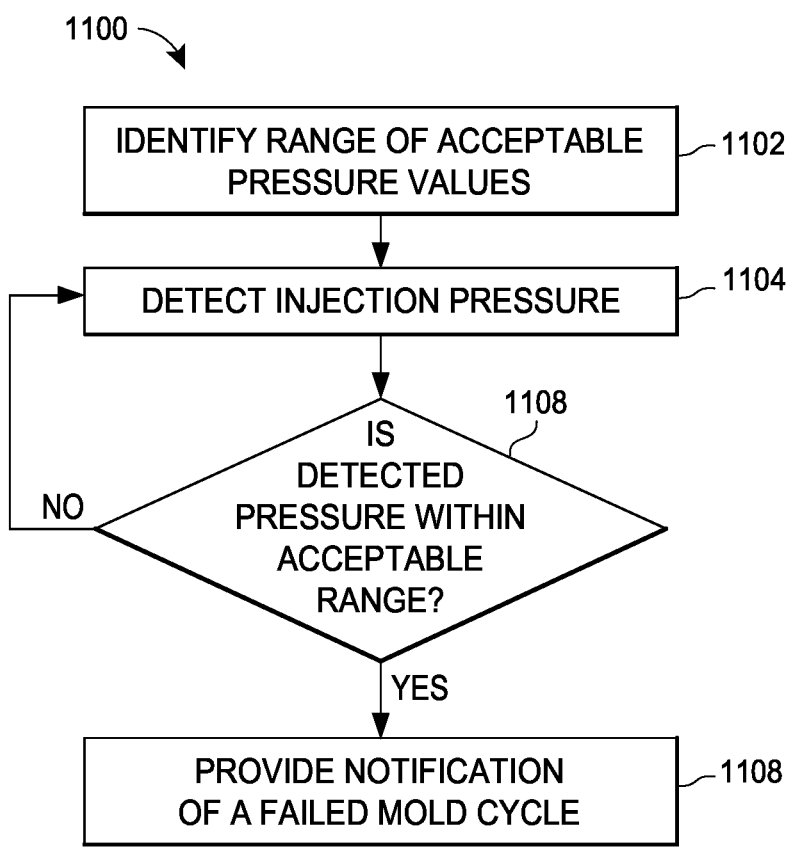
FIG. 11 is a flowchart of a method for providing a notification to user if a mold cycle has performed outside of defect-free parameters or other desired or required ranges of parameters.

After DOE parameters have been determined, mold cycles may be performed for DOE experiments for fabricating defect-free parts and pieces. FIG. 11 is a flowchart of a method 1100 that may be performed by the injection molding apparatus 10 of FIG. 1 for providing a notification to user if a mold cycle has performed outside of defect-free parameters or other desired or required ranges of parameters. The method 1100 includes the workstation computer 40 identifying a range of acceptable pressure values at block 1102. The range of acceptable pressure values may be determined from the LECR optimization processes described herein, by performed DOE experiments, or by a user input at a user interface of the workstation computer 40 or the controller 50. The user interface of the workstation computer 40 may include a touch screen, a keyboard, a numerical entry interface, a rotary knob, or another mechanical or digital interface. In embodiments, the range of pressure values may be determined by a processor, or retrieved by a processor or controller from a memory, network, or other machine readable media.

The method 1100 further includes detecting, by sensors such as the nozzle sensor 52 or the transducer 57 of the injection apparatus 10, a current injection pressure value of a current injection mold cycle at block 1104. Additionally, sensors and/or devices such as a cavity pressure sensor, a camera, in-mold sensory equipment, a temperature sensor, a strain sensor, or another sensor may be employed for detecting the current injection pressure value. Sensors and/or devices may measure a temperature and/or strain to determine a current injection pressure.

The workstation computer 40 may then determine whether the measured pressure value is within the range of acceptable pressure values at block 1106, and the workstation computer 20 may determine a pressure deviation value and provide the pressure deviation value to a user interface to be viewed or otherwise communicated to a user. The pressure deviation value may be determined by the difference of the measured pressure and a maximum or minimum pressure of the acceptable pressure range. If it is determined that the pressure is within the acceptable pressure value range ("Yes"), then the method returns to block 1104 and the sensors measure a new current pressure value and the new pressure value is communicated to the workstation computer 40. If it is determined, at block 1106, that the current measured pressure is not within the range of acceptable pressure values ("No") then the workstation computer 40 may identify that the mold cycle is operating outside of the acceptable range of injection pressure values and the workstation computer 40 generates a notification, which may include a calculated pressure deviation value, of a failed mold cycle at block 1108. The notification may be generated and provided to a user via a user interface of the workstation computer 40, or of the controller 50 which may include a touch screen, a smart device in communication with the workstation, or another visual display. Additionally, the notification may be a text message, e-mail, or other form of communication provided to a user that may be currently operating the injection mold machine either locally within a fabrication plant or remotely from an office or other location. In embodiments, if it determined that the injection mold cycle has failed, the workstation computer 40 may cause the controller 50 to control the injection molding apparatus 10 to stop the current injection mold cycle, or a user may be presented with the option to stop or continue the current injection mold cycle.

In any embodiment, the various step pressures and step times and other associated settings and parameters for performing an injection molding cycle may be provided by a user such as through a user interface of a controller or processor communicatively coupled to the workstation computer 40, the controller 50, and/or the injection molding apparatus 10. Alternatively, one or more of the parameters for performing an injection molding cycle may be determined by a processor, or retrieved by a workstation computer, processor, or controller from a memory, cloud network, or other media for storing data and information.

Together, the methods 400-800 perform the LECR optimization for determining one or more step pressures and step times for performing DOEs, and the methods 900 and 1000 determine a range of cooling times and range of PFA values for performing defect free, or minimal defect parts. The determined range of PFA values, cooling times, step pressure (or range of step pressures), and step time (or range of step times) may then be used as parameters, or recipes, for performing injection mold cycles for fabricating the defect-free, or minimal defect parts. The various determined parameters for the recipes may be used for fabricating defect free or minimal defect parts having a range of fabrication cycle times, and/or range of fabrication cycle step pressures. Further, the values of the various parameters may be detected in real time during an injection mold cycle to determine if a parameters is within an acceptable operating range for detecting a potentially failed injection mold cycle, and providing a notification to a user or system of the failed injection mold cycle.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Examples/Combinations

A. A method for optimization of an injection molding cycle, the method comprising:
obtaining, by a processor, a first plurality of pressure versus time data sets that define a low pressure versus time curve in pressure versus time coordinate space;
obtaining, by the processor, a second plurality of pressure versus time data sets that define a high pressure versus time curve in pressure versus time coordinate space;
defining, by the processor, two surfaces of a first geometric shape with the first surface of the first geometric shape being defined by the low pressure versus time curve and the second surface of the geometric shape being defined by the high pressure versus time curve, and a top surface and a bottom surface the top surface being defined by connecting the maximum pressure value data points of the first and second surfaces and the bottom surface being defined by connecting the minimum pressure value data points of the first and second surfaces;
defining, by the processor, a plurality of geometric shapes within the first geometric shape and restricted by the first geometric shape in the pressure versus time coordinate space;
identifying, by the processor, a geometric shape of the plurality of geometric shapes having the largest area in the pressure versus time coordinate space; and
generating, by the processor, design of experiment parameters from the largest area geometric shape.

B. The method of paragraph A, wherein obtaining the first plurality of pressure versus time data sets that define the low pressure versus time curve comprises:
executing, by a controller, a low pressure vs time curve calibration cycle in accordance with a mold cycle implemented by the injection molding machine;
executing, by the controller, a plurality of mold cycles performed by the injection molding machine, wherein each of the executed mold cycles has a corresponding fill step pressure and fill step time;
storing, in a memory, each of the corresponding fill step pressures and fill step times; and
defining, by the processor, the low pressure versus time curve as a subset of the fill step pressures and fill step times stored in the memory.

C. The method of paragraph B, further comprising:
receiving, at a user interface, an indication of a first mold cycle's low fill step pressure;
identifying, by the processor, a fill step time cycle increment;
defining, by the processor, each subsequent mold cycle's fill step time from the first mold cycle's fill step pressure and fill step time increment.

D. The method of any one of paragraphs A-C, wherein obtaining the second plurality of pressure versus time data sets that define the high pressure versus time curve comprises:
executing, by a controller, a high pressure vs time curve calibration cycle in accordance with a mold cycle implemented by an injection molding machine;
executing, by the controller, a plurality of mold cycles performed by the injection molding machine, wherein each of the executed mold cycles has a corresponding fill step pressure and fill step time;
storing, in a memory, each of the fill step pressures and fill step times; and
defining, by the processor, the high pressure versus time curve as a subset of the fill step pressure and fill step times stored in the memory.

E. The method of paragraph D, further comprising:
receiving, at a user interface, an indication of a second mold cycle's high fill step pressure;
identifying, by the processor, a fill step time cycle increment;
defining, by the processor, each subsequent mold cycle's fill step time from the second mold cycle's fill step pressure and fill step time increment.

F. The method of any one of paragraphs A-E, further comprising:
identifying, by the processor, a center point of the identified largest area rectangle, the center point comprising a fill step pressure and fill step time in the pressure versus time coordinate space.

G. The method of paragraph F, further comprising:
identifying, by the processor, a range of step time values around the center point, including the center point;
identifying, by the processor, a range of step pressure values around the center point, including the center point; and
wherein generating the design of experiment parameters from the largest area geometric shape comprises generating the design of experiment parameters from the identified range of step times and identified range of step pressures.

H. The method of paragraph F, further comprising:
controlling, by the controller, an injection mold system to perform an injection molding cycle according to the fill step pressure and fill step time of the identified center point.

I. The method of paragraph H, further comprising:
detecting, by a sensor, a current injection pressure value;
receiving, at the user interface, a pressure deviation value;
identifying, by the processor, a predetermined range of injection pressure values from the fill step pressure and fill step time of the identified center point, the pressure deviation value, and the current injection pressure value;
identifying, by the processor, a mold cycle operating outside of a predetermined range of injection pressure values; and
notifying, by the user interface, an operator of the injection molding system of the failure of the mold cycle.

J. The method of paragraph I, wherein the current injection pressure value is detected by at least one of a cavity pressure sensor, a camera, in-mold sensory equipment, a measured temperature, and a measured strain.

K. The method of any one of paragraphs A-J, wherein generating the design of experiment parameters from the largest area geometric shape comprises identifying, by the processor, a series of fill step pressures and fill step times in the pressure versus time coordinate space.

L. The method of any one of paragraphs A-K, wherein the design of experiment parameters includes at least one of a cooling time, a pressure process factor, a step time, or a step pressure.

M. The method of any one of paragraphs A-L, wherein the low pressure versus time curve is defined by a mathematical regression performed on a subset of the data in the first plurality of pressure versus time data sets; and
wherein the high pressure versus time curve is defined by a mathematical regression performed on a subset of the data in the second plurality of pressure versus time data sets.

N. The method of any one of paragraphs A-M, wherein the low pressure versus time curve is indicative of the lowest fill step pressure and fill step time value combinations for calibrating an injection molding machine to perform an injection molding cycle that fabricates molded parts without defects associated with insufficient pressure.

O. The method of any one of paragraphs A-N, wherein the high pressure versus time curve is indicative of the highest fill step pressure and fill step time value combinations for calibrating an injection molding machine to perform an injection molding cycle that fabricates molded parts without defects associated with overpressurization.

P. The method of any one of paragraphs A-O, wherein each of the plurality of geometric shapes has a first vertex being a data point on the low pressure versus time curve, and a second vertex being a data point on the high pressure versus time curve.

Q. The method of any one of paragraphs A-P, further comprising:
obtaining, by the processor, cooling time data sets, the cooling time data sets corresponding to data points defining the boundaries of the identified rectangle with the largest area in the pressure versus time coordinate space;
identifying, by the processor, a low cooling time, the low cooling time being a cooling time indicated by one of the data points in the cooling time data sets;
identifying, by the processor, a high cooling time, the high cooling time being a cooling time indicated by one of the data points in the cooling time data sets; and
calibrating, by the controller, the injection molding machine to perform an injection mold cycle with a cooling time between the identified low cooling time and high cooling time.

R. The method of any one of paragraphs A-Q, further comprising:
obtaining, by the processor, pressure process factor (PFA) data sets, the pressure process factor data sets corresponding to data points defining the boundaries of the identified rectangle with the largest area in the pressure versus time coordinate space;
identifying, by the processor, a low pressure process factor value, the low pressure process factor value being a value indicated by one of the data points in the pressure process factor data sets;
identifying, by the processor, a high pressure process factor value, the high pressure process factor value being a value indicated by one of the data points in the pressure process factor data sets; and
calibrating, by a controller, the injection molding machine to perform an injection mold cycle with a pressure process factor between the identified low pressure process factor value and high pressure process factor value.

S. The method of any one of paragraphs A-R, further comprising calibrating, by a controller, the injection molding machine to perform an injection mold cycle using a fill step pressure and corresponding fill step time indicated by a data point within the identified geometric shape having the largest area in the pressure versus time coordinate space.

T. A method for optimization of an injection molding cycle, the method comprising:
obtaining, by a processor, a first plurality of pressure versus time data sets that define a low pressure versus time curve in pressure versus time coordinate space;
obtaining, by the processor, a second plurality of pressure versus time data sets that define a high pressure versus time curve in pressure versus time coordinate space;
defining, by the processor, two surfaces of a first geometric shape with the first surface of the first geometric shape being defined by the low pressure versus time curve and the second surface of the geometric shape being defined by the high pressure versus time curve, and a top surface and a bottom surface the top surface being defined by connecting the maximum pressure value data points of the first and second surfaces and the bottom surface being defined by connecting the minimum pressure value data points of the first and second surfaces;
defining, by the processor, a plurality of polygons within, and restricted by, the first geometric shape in the pressure versus time coordinate space;
identifying, by the processor, a polygon of the plurality of polygons having the largest area in the pressure versus time coordinate space; and
generating, by the processor, design of experiment parameters from the largest area polygon.

U. An injection molding system comprising:
an injection unit having a mold forming a mold cavity and a screw that moves from a first position to a second position, the injection unit adapted to receive and inject a molten plastic material into the mold cavity via the screw to form a molded part;
a controller adapted to control operation of the injection molding machine according to an injection cycle;
a processor configured to execute machine executable instructions that cause the processor to:
obtain a first plurality of pressure versus time data sets that define a low pressure versus time curve in pressure versus time coordinate space;
obtain a second plurality of pressure versus time data sets that define a high pressure versus time curve in pressure versus time coordinate space;
define two surfaces of a first geometric shape with the first surface of the first geometric shape being defined by the low pressure versus time curve and the second surface of the geometric shape being defined by the high pressure versus time curve, and a top surface and a bottom surface the top surface being defined by connecting the maximum pressure value data points of the first and second surfaces and the bottom surface being defined by connecting the minimum pressure value data points of the first and second surfaces;
define a plurality of geometric shapes within the first geometric shape and restricted by the first geometric shape in the pressure versus time coordinate space;
identify a geometric shape of the plurality of geometric shapes having the largest area in the pressure versus time coordinate space; and
generate, design of experiment parameters from the largest area geometric shape.

V. The injection molding system of paragraph U, wherein to obtain the first plurality of pressure versus time data sets that define the low pressure versus time curve the system is configured to:

execute, by the controller, a low pressure vs time curve calibration cycle in accordance with a mold cycle implemented by the injection molding machine;

execute, by the controller, a plurality of mold cycles performed by the injection molding machine, wherein each of the executed mold cycles has a corresponding fill step pressure and fill step time;

store, in a memory, each of the corresponding fill step pressures and fill step times; and defining, by the processor, the low pressure versus time curve as a subset of the fill step pressures and fill step times stored in the memory.

W. The injection molding system of paragraph U or V, wherein the processor is further configured to:

receive, at a user interface, an indication of a first mold cycle's low fill step pressure;

identify a fill step time cycle increment; and define each subsequent mold cycle's fill step time from the first mold cycle's fill step pressure and fill step time increment.

X. The injection molding system of paragraph U, wherein to obtain the second plurality of pressure versus time data sets that define the high pressure versus time curve the system is configured to:

execute, by a controller, a high pressure vs time curve calibration cycle in accordance with a mold cycle implemented by an injection molding machine;

execute, by the controller, a plurality of mold cycles performed by the injection molding machine, wherein each of the executed mold cycles has a corresponding fill step pressure and fill step time;

store, in a memory, each of the fill step pressures and fill step times; and define, by the processor, the high pressure versus time curve as a subset of the fill step pressure and fill step times stored in the memory.

Y. The injection molding system of paragraph X, wherein the processor is further configured to:

receive, at a user interface, an indication of a second mold cycle's high fill step pressure;

identify a fill step time cycle increment;

define each subsequent mold cycle's fill step time from the second mold cycle's fill step pressure and fill step time increment.

Z. The injection molding system of any one of paragraphs U-Y, wherein the processor is further configured to identify a center point of the identified largest area rectangle, the center point comprising a fill step pressure and fill step time in the pressure versus time coordinate space.

AA. The injection molding system of any one of paragraphs U-Z, wherein the processor is further configured to:

identify a range of step time values around the center point, including the center point;

identify a range of step pressure values around the center point, including the center point; and wherein to generate the design of experiment parameters from the largest area geometric shape the processor generates the design of experiment parameters from the identified range of step times and identified range of step pressures.

AB. The injection molding system of paragraph Z, wherein the controller is further configured to control the injection unit to perform an injection molding cycle according to the fill step pressure and fill step time of the identified center point.

AC. The injection molding system of paragraph AB, wherein the injection molding system is further configured to:

detect, by a sensor, a current injection pressure value;

receive, at the user interface, a pressure deviation value;

identify, by the processor, a predetermined range of injection pressure values from the fill step pressure and fill step time of the identified center point, the pressure deviation value, and the current injection pressure value;

identify, by the processor, a mold cycle operating outside of a predetermined range of injection pressure values; and notify, by the user interface, an operator of the injection molding system of the failure of the mold cycle.

AD. The injection molding system of paragraph AC, wherein the current injection pressure value is detected by at least one of a cavity pressure sensor, a camera, in-mold sensory equipment, a measured temperature, and a measured strain.

AE. The injection molding system of any one of paragraphs U-AD, wherein to generate the design of experiment parameters from the largest area geometric shape, the processor identifies a series of fill step pressures and fill step times in the pressure versus time coordinate space.

AF. The injection molding system of any one of paragraphs U-AE, wherein the design of experiment parameters includes at least one of a cooling time, a pressure process factor, a step time, or a step pressure.

AG. The injection molding system of any one of paragraphs U-AF, wherein the low pressure versus time curve is defined by a mathematical regression performed on a subset of the data in the first plurality of pressure versus time data sets; and wherein the high pressure versus time curve is defined by a mathematical regression performed on a subset of the data in the second plurality of pressure versus time data sets.

AH. The injection molding system of any one of paragraphs U-AG, wherein the low pressure versus time curve is indicative of the lowest fill step pressure and fill step time value combinations for calibrating an injection molding machine to perform an injection molding cycle that fabricates molded parts without defects associated with insufficient pressure.

AI. The injection molding system of any one of paragraphs U-AH, wherein the high pressure versus time curve is indicative of the highest fill step pressure and fill step time value combinations for calibrating an injection molding machine to perform an injection molding cycle that fabricates molded parts without defects associated with overpressurization.

AJ. The injection molding system of any one of paragraphs U-AI, wherein each of the plurality of geometric shapes has a first vertex being a data point on the low pressure versus time curve, and a second vertex being a data point on the high pressure versus time curve.

AK. The injection molding system of any one of paragraphs U-AJ, wherein the system is further configured to:

obtain, by the processor, cooling time data sets, the cooling time data sets corresponding to data points defining the boundaries of the identified rectangle with the largest area in the pressure versus time coordinate space;

identify, by the processor, a low cooling time, the low cooling time being a cooling time indicated by one of the data points in the cooling time data sets;

identify, by the processor, a high cooling time, the high cooling time being a cooling time indicated by one of the data points in the cooling time data sets; and calibrate, by the controller, the injection molding machine to perform an injection mold cycle with a cooling time between the identified low cooling time and high cooling time.

AL. The injection molding system of any one of paragraphs U-AK, wherein the system is further configured to:
obtain, by the processor, pressure process factor (PFA) data sets, the pressure process factor data sets corresponding to data points defining the boundaries of the identified rectangle with the largest area in the pressure versus time coordinate space;
identify, by the processor, a low pressure process factor value, the low pressure process factor value being a value indicated by one of the data points in the pressure process factor data sets;
identify, by the processor, a high pressure process factor value, the high pressure process factor value being a value indicated by one of the data points in the pressure process factor data sets; and
calibrate, by the controller, the injection molding machine to perform an injection mold cycle with a pressure process factor between the identified low pressure process factor value and high pressure process factor value.

AM. The injection molding system of any one of paragraphs U-AL, further comprising calibrating, by a controller, the injection molding machine to perform an injection mold cycle using a fill step pressure and corresponding fill step time indicated by a data point within the identified geometric shape having the largest area in the pressure versus time coordinate space.

What is claimed is:

1. A method for optimization of an injection molding cycle, the method comprising:
obtaining, by a processor, a first plurality of step pressure versus step time data sets that define a low step pressure versus step time curve in step pressure versus step time coordinate space, wherein the first plurality of step pressure versus step time data are generated by configuring a controller of an injection molding machine to execute a first plurality of mold cycles having respective fill step pressure values and fill step time values;
obtaining, by the processor, a second plurality of step pressure versus step time data sets that define a high step pressure versus step time curve in step pressure versus step time coordinate space, wherein the second plurality of step pressure versus step time data are generated by configuring a controller of an injection molding machine to execute a second plurality of mold cycles having respective fill step pressure values and fill step time values;
defining, by the processor, two surfaces of a first geometric shape with the first surface of the first geometric shape being defined by the low pressure versus step time curve and the second surface of the geometric shape being defined by the high pressure versus step time curve, and a top surface and a bottom surface the top surface being defined by connecting the maximum pressure value data points of the first and second surfaces and the bottom surface being defined by connecting the minimum pressure value data points of the first and second surfaces;
defining, by the processor, a plurality of geometric shapes within the first geometric shape and restricted by the first geometric shape in the step pressure versus step time coordinate space, wherein the geometric shapes in the plurality of geometric shapes have one vertex on the low pressure versus step time curve and one vertex on the high pressure versus step time curve;
identifying, by the processor, a geometric shape of the plurality of geometric shapes having the largest area in the step pressure versus step time coordinate space;
identifying, by the processor, a step pressure versus step time coordinate from inside of the identified geometric shape having the largest area; and
configuring, by the processor, the controller of the injection molding machine to initiate a design of experiments process based on the identified step pressure versus step time coordinate by configuring a mold cycle profile that controls operation of the injection molding machine to include a step pressure value and a step time value indicated by the identified step pressure versus step time coordinate.

2. The method of claim 1, wherein obtaining the first plurality of step pressure versus step time data sets that define the low pressure versus step time curve comprises:
executing, by the controller, a low step pressure vs step time curve calibration cycle in accordance with a mold cycle implemented by the injection molding machine;
executing, by the controller, the first plurality of mold cycles performed by the injection molding machine;
storing, in a memory, each of the corresponding fill step pressures and fill step times; and
defining, by the processor, the low pressure versus step time curve as a subset of the fill step pressures and fill step times stored in the memory.

3. The method of claim 2, further comprising:
receiving, at a user interface, an indication of a first mold cycle's low fill step pressure;
identifying, by the processor, a fill step time cycle increment;
defining, by the processor, each subsequent mold cycle's fill step time from the first mold cycle's fill step pressure and fill step time increment.

4. The method of claim 1, wherein obtaining the second plurality of step pressure versus step time data sets that define the high pressure versus step time curve comprises:
executing, by the controller, a high step pressure vs step time curve calibration cycle in accordance with a mold cycle implemented by an injection molding machine;
executing, by the controller, the second plurality of mold cycles performed by the injection molding machine;
storing, in a memory, each of the fill step pressures and fill step times; and
defining, by the processor, the high pressure versus step time curve as a subset of the fill step pressure and fill step times stored in the memory.

5. The method of claim 4, further comprising:
receiving, at a user interface, an indication of a second mold cycle's high fill step pressure;
identifying, by the processor, a fill step time cycle increment;
defining, by the processor, each subsequent mold cycle's fill step time from the second mold cycle's fill step pressure and fill step time increment.

6. The method of claim 1, further comprising:
identifying, by the processor, a center point of the identified largest area geometric shape, the center point comprising a fill step pressure and fill step time in the step pressure versus step time coordinate space.

7. The method of claim 6, further comprising:
identifying, by the processor, a range of step time values around the center point, including the center point;
identifying, by the processor, a range of step pressure values around the center point, including the center point; and
wherein identifying the step pressure versus step time coordinate from the largest area geometric shape comprises identifying the step pressure versus step time coordinate from the identified range of step times and identified range of step pressures.

8. The method of claim 6, further comprising:
controlling, by the controller, an injection mold system to perform an injection molding cycle according to the fill step pressure and fill step time of the identified center point.

9. The method of claim 8, further comprising:
detecting, by a sensor, a current injection pressure value;
receiving, at the user interface, a pressure deviation value;
identifying, by the processor, a predetermined range of injection pressure values from the fill step pressure and fill step time of the identified center point, the pressure deviation value, and the current injection pressure value;
identifying, by the processor, a mold cycle operating outside of a predetermined range of injection pressure values; and
notifying, by the user interface, an operator of the injection molding system of the failure of the mold cycle.

10. The method of claim 9, wherein the current injection pressure value is detected by at least one of a cavity pressure sensor, a camera, in-mold sensory equipment, a measured temperature, and a measured strain.

11. The method of claim 1, wherein identifying the step pressure versus step time coordinate from the largest area geometric shape comprises identifying, by the processor, a series of fill step pressures and fill step times in the step pressure versus step time coordinate space.

12. The method of claim 1, wherein the design of experiment parameters includes at least one of a cooling time, a pressure process factor, a step time, or a step pressure.

13. The method of claim 1, wherein the low step pressure versus step time curve is defined by a mathematical regression performed on a subset of the data in the first plurality of step pressure versus step time data sets; and
wherein the high pressure versus time curve is defined by a mathematical regression performed on a subset of the data in the second plurality of step pressure versus step time data sets.

14. The method of claim 1, wherein the low step pressure versus step time curve is indicative of the lowest fill step pressure and fill step time value combinations for configuring an injection molding machine to perform an injection molding cycle that fabricates molded parts without defects associated with insufficient pressure.

15. The method of claim 1, wherein the high step pressure versus step time curve is indicative of the highest fill step pressure and fill step time value combinations for configuring an injection molding machine to perform an injection molding cycle that fabricates molded parts without defects associated with overpressurization.

16. The method of claim 1, further comprising:
obtaining, by the processor, cooling time data sets, the cooling time data sets corresponding to data points defining the boundaries of the identified geometric shape with the largest area in the pressure versus step time coordinate space;
identifying, by the processor, a low cooling time, the low cooling time being a cooling time indicated by one of the data points in the cooling time data sets;
identifying, by the processor, a high cooling time, the high cooling time being a cooling time indicated by one of the data points in the cooling time data sets; and
configuring, by the processor, the mold cycle profile of the controller to include a cooling time between the identified low cooling time and high cooling time.

17. The method of claim 1, further comprising:
obtaining, by the processor, pressure process factor (PFA) data sets, the pressure process factor data sets corresponding to data points defining the boundaries of the identified geometric shape with the largest area in the pressure versus step time coordinate space;
identifying, by the processor, a low pressure process factor value, the low pressure process factor value being a value indicated by one of the data points in the pressure process factor data sets;
identifying, by the processor, a high pressure process factor value, the high pressure process factor value being a value indicated by one of the data points in the pressure process factor data sets; and
configuring, by the processor, the mold cycle profile of the controller to include a pressure process factor between the identified low pressure process factor value and high pressure process factor value.

18. A method for optimization of an injection molding cycle, the method comprising:
obtaining, by a processor, a first plurality of step pressure versus step time data sets that define a low pressure versus step time curve in step pressure versus step time coordinate space, wherein the first plurality of step pressure versus step time data are generated by configuring a controller of an injection molding machine to execute a first plurality of mold cycles having respective fill step pressure values and fill step time values;
obtaining, by the processor, a second plurality of step pressure versus step time data sets that define a high pressure versus step time curve in step pressure versus step time coordinate space, wherein the second plurality of step pressure versus step time data are generated by configuring a controller of an injection molding machine to execute a second plurality of mold cycles having respective fill step pressure values and fill step time values;
defining, by the processor, two surfaces of a first geometric shape with the first surface of the first geometric shape being defined by the low pressure versus step time curve and the second surface of the geometric shape being defined by the high pressure versus step time curve, and a top surface and a bottom surface the top surface being defined by connecting the maximum pressure value data points of the first and second surfaces and the bottom surface being defined by connecting the minimum pressure value data points of the first and second surfaces;
defining, by the processor, a plurality of polygons within, and restricted by, the first geometric shape in the step pressure versus step time coordinate space, wherein the geometric shapes in the plurality of geometric shapes have one vertex on the low pressure versus step time curve and one vertex on the high pressure versus step time curve;
identifying, by the processor, a polygon of the plurality of polygons having the largest area in the step pressure versus step time coordinate space;
selecting, by the processor, a step pressure versus step time coordinate from inside of the identified geometric shape having the largest area; and
configuring, by the processor, the controller of the injection molding machine to initiate a design of experiments process based on the selected step pressure versus step time coordinate by configuring a mold cycle profile that controls operation of the injection molding machine to include a step pressure value and a step time value indicated by the identified step pressure versus step time coordinate.

* * * * *